(12) United States Patent
Elberbaum

(10) Patent No.: US 7,171,106 B2
(45) Date of Patent: Jan. 30, 2007

(54) METHOD AND APPARATUS FOR PROCESSING, DIGITALLY RECORDING AND RETRIEVING A PLURALITY OF VIDEO SIGNALS

(75) Inventor: David Elberbaum, Tokyo (JP)

(73) Assignee: Elbex Video Ltd., Tokyo (JP)

( * ) Notice: Subject to any disclaimer, the term of this patent is extended or adjusted under 35 U.S.C. 154(b) by 1158 days.

(21) Appl. No.: 09/818,243

(22) Filed: Mar. 27, 2001

(65) Prior Publication Data
US 2002/0141731 A1    Oct. 3, 2002

(51) Int. Cl.
    H04N 7/00    (2006.01)
    H04N 7/18    (2006.01)
(52) U.S. Cl. .......................... 386/46; 386/92; 348/143
(58) Field of Classification Search ................. 386/46, 386/92, 95, 107, 108, 109, 111, 112, 117; 348/143, 153, 154, 156
See application file for complete search history.

(56) References Cited

U.S. PATENT DOCUMENTS 5,267,039 A * 11/1993 Elberbaum .................. 348/476

6,359,560 B1 * 3/2002 Budge et al. ............... 340/541
2002/0147982 A1 * 10/2002 Naidoo et al. .............. 725/105

* cited by examiner

Primary Examiner—Robert Chevalier
(74) Attorney, Agent, or Firm—Katten Muchin Rosenman LLP

(57) ABSTRACT

A method and apparatus for processing and digital recording video signal where transmitters for generating video signals receive an external synchronizing signal for synchronizing the transmitters. A recorder receiving the video signals has a switch sequentially connecting the transmitters to a digital video recorder. Code signals corresponding to identification codes allotted to video signals are generated. An injection circuit mixes code signals into video signals. The digital video recorder has a copy including circuit for time and date signal generating, for compressing the received signals and outputting them with the extracted codes and time and date of recorder signals to a memory storing those signals in endless cascaded rotation. Freshly stored signals replace the oldest signals stored in cascade. An alarm data signal for triggering the alarm state of the apparatus is received and the video signals recorded during the alarm state are recorded.

35 Claims, 16 Drawing Sheets

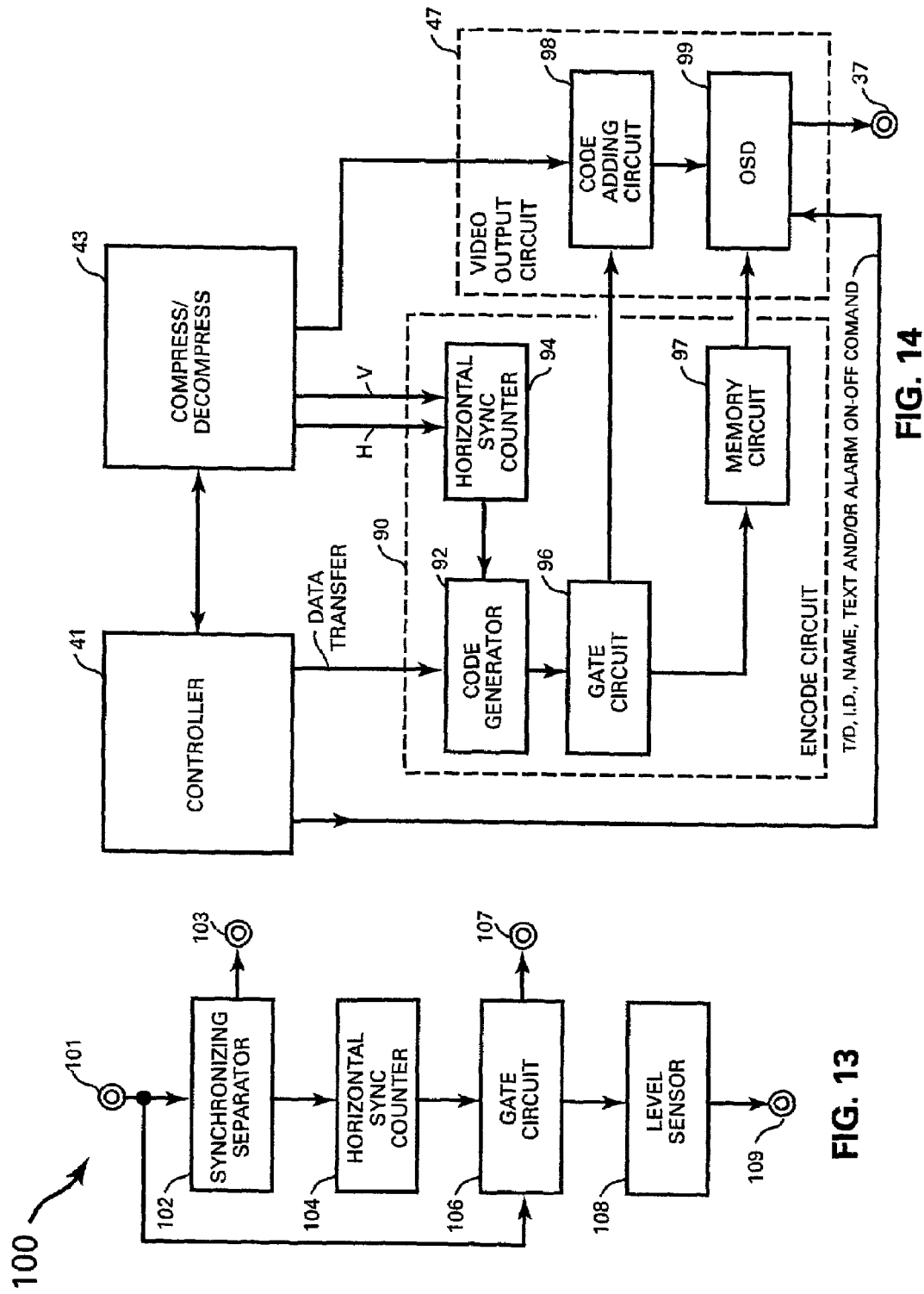

METHOD AND APPARATUS FOR PROCESSING, DIGITALLY RECORDING AND RETRIEVING A PLURALITY OF VIDEO SIGNALS

BACKGROUND OF THE INVENTION

1. Field of the Invention

This invention relates to an apparatus for processing television camera signals used in close circuit television for recording and monitoring system.

2. Description of the Prior Art

In a monitoring television system used, as one of information transmission systems, at least one video cassette recorder or a digital video recorder is connected through an electronic switch to a plurality of television cameras and transmission lines. The electronic switch provides for a fast rate sequential switching for recording onto the video recorder a picture image of one camera after another.

In such an information transmission system, it is preferable to mutually lock the internal synchronizing signals of a plurality of television cameras and the electronic switching time to an external synchronizing signal, in order to prevent the recording from being disturbed during and immediately after the switching operation from one television camera to another.

A known apparatus for synchronizing a plurality of television cameras is an apparatus for transmitting an external synchronizing signals from an external synchronizing generator to the television cameras by injecting the external synchronizing signal into the video signal transmission line and locking an internal synchronizing signal generator of the television camera by means of the transmitted external synchronizing signal. Such an apparatus is disclosed in U.S. Pat. No. 4,603,352 the contents of which are incorporated herein by reference.

Another known apparatus for synchronizing the plurality of the television camera signals is an apparatus for memorizing each of the television camera signal in a memory circuit and feeding the signals to the video recorder, synchronously via the electronic switch from the memory circuits. Such an apparatus is disclosed in U.S. Pat. No. 5,267,039 the content of which are incorporated herein by reference.

Furthermore, the known apparatuses for recording a plurality of camera signals at fast sequencing rate require that each individual camera signal will incorporate coded identification signals, providing for a simple retrieval of the signal through a coded selection. In the case of using analog video cassette recorder, the coded identification is known to be recorded during the vertical blanking period of the television signals, but in the case of using a digital video recorder it is known that digital video recorders ignore the vertical blanking period and instead they employ a complex control software for indexing the files of the recorded digital signals of each individual camera.

Because the software programs for controlling the individual files of the digitally recorded camera signals are complex, it renders the processing, transferring and/or retrieval of the recorded digital signals to and from disks, tapes or other medium time consuming. Moreover, because of the limited capacity of the digital recorder's storage medium the digital video recorders record in a continuous FIFO (First In First Out) rotation, and it is necessary to introduce protection software programs for the recorded alarms or event files in order to retain such recording for extended periods by excluding such alarms and events files from the FIFO process. The continued randomly changing, deletion and/or addition of protected files causes an extremely complex and inefficient FIFO recording in rotation, particularly when large numbers of television cameras are used. Moreover, the complexity of the software programs makes it literally impossible to combine plurality of digital recorders for increasing the overall storage capacity.

In another known digital recording system, a plurality of camera signals are processed in parallel instead of being sequentially switched and are stored in individual files within the digital recorder storage medium, but due to the limited storage capacity the recording is also processed in FIFO rotation and similar file protection software programs are necessary. The complexity of such programs for managing large number of files in the FIFO rotation and the continuous changes and addition to the protection files makes the software for the system management laborious, costly and inefficient. Here too the complexity of the software programs along with the plurality of input connectors makes it literally impossible and/or prohibitively expensive to interconnect and/or combine multiple digital recorders in order to increase the overall storage capacity.

SUMMARY OF THE INVENTION

It is the object of the present invention to provide a method and an apparatus for a continuous digital recording of a sequentially switched or parallely fed plurality of camera signals in a simple, uninhibited rotation into a single stand-alone digital recorder or into multiple, cascaded digital recorders and to retrieve any of the recorded images on the basis of the recorded time and date and without the need to search complex arrays of files for any specific recorded file or files pertaining a specific camera or cameras.

According to the present invention a method for processing, recording and retrieving video signals generated by a plurality of synchronized video transmitters, each incorporating an individually allotted identification code signal, into and from a digital recorder having at least one main memory storage device for routinely recording the camera signals in endless rotation, and an exclusive memory device for storing and retaining camera signals recorded during alarms and an alarm signal input, comprises the steps of detecting an identification code of each individual video signal and compressing the video signals one after another in sequence or in parallel and storing the compressed individual signals along with the individual identification code thereof and the time and date of the recording in a continuous cycle into at least one main memory storage device to full capacity, one after another in endless cascaded rotation, wherein freshly processed signals replace the oldest stored signals. Identifying the individual code signals and time and date of the recorded video signals related to inputted alarm signals and/or to pre-alarm, and/or post alarm time and transferring or duplicating the recorded camera signals related to the inputted alarm signals into the exclusive alarm memory device which is excluded from routine recording in the endless cascaded rotation, protects the alarm related recordings from routine erasure and retaining the alarm related recordings for future playback. The routinely recorded camera signals and/or the alarm related camera signals are played back by retrieving the recorded signals from the main storage device and/or the exclusive storage device on the basis of the recording time and date and/or the stored identification code or codes and/or the inputted alarm signals, decompressing the signals and re-injecting the identification code signals with the time and date signals, into the vertical blanking portion of the decompressed outputted video signals.

The method for processing, recording and retrieving video signals further comprises the steps of combining a plurality of said digital recorders in a cascaded recording rotation for enlarging the total recording capacity, wherein each of the cascaded digital recorders, records to its full capacity in rotation one after another in endless cascaded rotation, and wherein freshly processed signals replace the oldest stored signals.

Recalling for playback any recorded individual camera signals through any of the cascaded digital recorder is achieved through a playback receiving means adapted to select an individual signal from serially fed sequencing signals by generating a selection command on the basis of the recalled camera identification, the time and date of the recording and/or alarm particulars.

An apparatus for processing, recording and retrieving a signal according to the present invention comprises a receiving means including a plurality of transmitting means, for generating analog or digital video signals incorporating an identification code signal allotted to each transmitting means; an external synchronizing generator for generating an external synchronization signal for synchronizing internal synchronizing generators of the transmitting means and the receiving means, a recording receiver including an electronic switch for receiving the video signals transmitted from said transmitting means, for processing and feeding the video signals sequentially through an electronic switch in rotation one after another at a predetermined rate and time to the recording means, or for converting parallel processed signals into serial digital signals and feeding the processed signals to the recording means; a recording means for recording and storing the processed video signals received from the receiving means along with identification codes and the time and date of the recording and for playing back the stored signals and outputting the played back signals; an encoding/decoding means for extracting and decoding the identification code signal of the video signals fed from the receiving means and for encoding and injecting newly the identification signals along with the time and date into a vertical blanking portion of the played back signals; a selector means for setting a selector code commensurate with a code allotted to each transmitting means for outputting a code select command and at least of a time and date select command, and feeding outputted commands to the recording means for recalling playback signals for at least one of specific time, specific date and specific coded signals; and a monitor to display the image of the retrieved video signal from the recording means.

Each of the transmitting means includes a television camera to which an identification code is allotted. The television may incorporate a circuit for generating code signals corresponding to the identification code, and a circuit for generating a signal wherein the code signals are injected into the video signal. Such an apparatus is disclosed in U.S. Pat. No. 4,943,864, the contents of which are incorporated herein by reference.

Alternatively, the allotted identification code signals can be generated by code generators for injecting a code signal into the video signal along each individual transmission line or by a code generator and code mixing circuits incorporated in the recording receiver for injecting a code into the output video signals coordinated and in concert with the switching means, or by generating and injecting the code signals into the multi-input processor of the recording receiver.

The switching means may include an electronic switch for connecting the video signals fed from the transmitting means in a selectable, predetermined, time and rate sequence, for feeding the individual coded video signals one after another to the recording means. It is preferable that the switching rate will commensurate with the frequency of the vertical period of the video signal, and that the predetermined time is at least one vertical period of the video signal.

When the video signals generated by the transmitting means are analog signals and the transmitting means are not externally synchronized, the recording receiver may include at least one of a sync separator circuit, an analog to digital converter, and a memory circuit for reorganizing the time base of the inputted signals, such, that the video signals processed within the recording receiver and sequentially switched by the switching means are in tandem with the external sync. generator.

The recording means may include a circuit for compressing the received video signals and outputting the compressed signals to the memory means, a circuit for decompressing the retrieved stored signals and a circuit for converting the decompressed signals to a video signal along with a circuit for injecting the identification code signal and the time and date into the vertical blanking portion of the video signals.

The recording means may further include a CPU (central processing unit) for processing and controlling the different circuits, the time and date, and other functions of the digital recording process and for controlling the memory devices used for storing the digital signals through a memory system control circuit.

The CPU is fed with key commands or remote commands or by an alarm input signals through a control in terminal or terminals and feeds an output control command through an output control terminal for combining in a cascaded connection a plurality of recording means for increasing the capacity of the recording means.

The CPU is provided with means for setting a coded station number to the recording means for enabling a simple addressing of a specific recording means for recalling playback signals from the cascaded chain of recording means, or for addressing a specific recording means of the cascaded chain connected along with pluralities of cascaded chains, to a playback receiver means.

A cascaded chain of the recording means may include a video distributor to distribute the video signals outputted from the receiving means to the plurality of the recording means in the cascaded chain, a control unit for connecting in a cascaded chain the control in-out terminals of the recording means and to an alarm input signal, and a selector for connecting the outputs of the recording means of the cascaded chain and feeding a selective output to the playback receiver means.

The playback receiver means may include a selector and a circuit for setting a selector code, a circuit for extracting and decoding the identification code signal from the received video signal, and a circuit to retrieve from the sequencing video signals received from the recording means, the selected video signal, and output the retrieved video signal to a television monitor.

The playback receiver means may include a circuit for generating displays onto the monitor screen known as the OSD (on screen display) circuit for displaying on command the identification number of the selected camera or its name and/or text related to the decoded identification number, and a memory circuit for recording and retaining the text and/or names of the identification code number used for the plurality of cameras connected to any of the digital recording means of a digital recording system setup.

The OSD circuit along with the identification decoding circuit further provides the decoding of the time and date contained in the vertical blanking portion of the extracted signal and the display, upon command, of the time and date of the recording of the played back video signal.

The playback receiver means may further include a playback control circuit for feeding control signals to the digital recorder means for selecting a playback signal from any of the connected digital recorder means on the basis of a camera identification code, the camera name, the time and date of the recording, an alarm input signal and or any of cascaded chain of digital recorder means or individual digital recorder means through the station identification code thereof thereby providing a simple playback selection for any number of digital recorder means, connected individually or from a plurality of cascaded chains.

BRIEF DESCRIPTION OF THE DRAWING

The foregoing and other objects and features of the invention will become apparent from the following description of preferred embodiments of the invention with reference to the accompanying drawings, in which:

FIG. 13 is a block diagram showing a selective code processing circuit as a preferred embodiment of the present invention;

FIG. 14 is a block diagram showing a further embodiment of the code extracting circuit of the present invention;

DETAILED DESCRIPTION OF THE PREFERRED EMBODIMENTS

Figure 1:
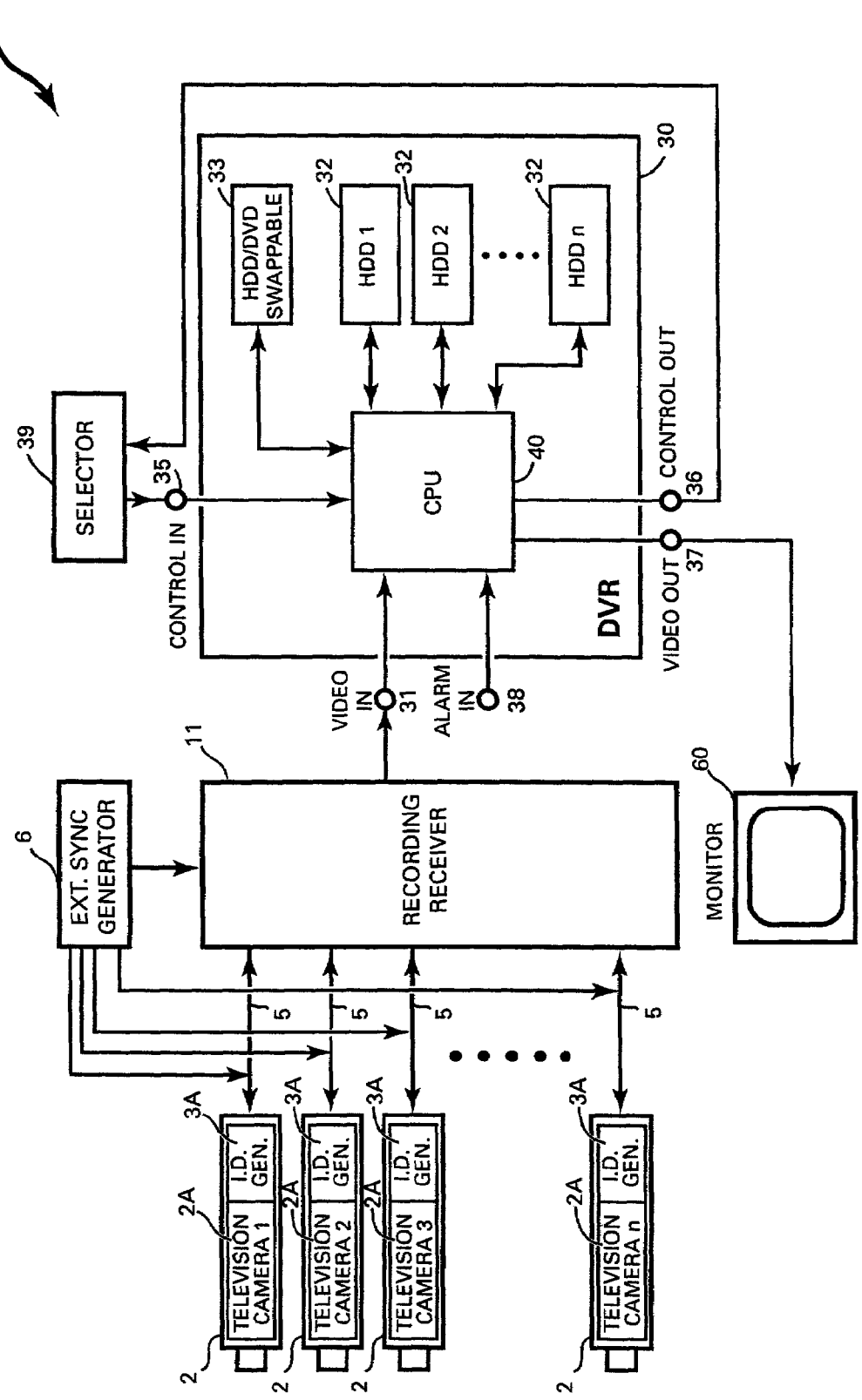
FIG. 1 is a block diagram showing an electric circuit for processing digital recording, and retrieving signal apparatus of the preferred embodiment according to the present invention.
Figure 2:
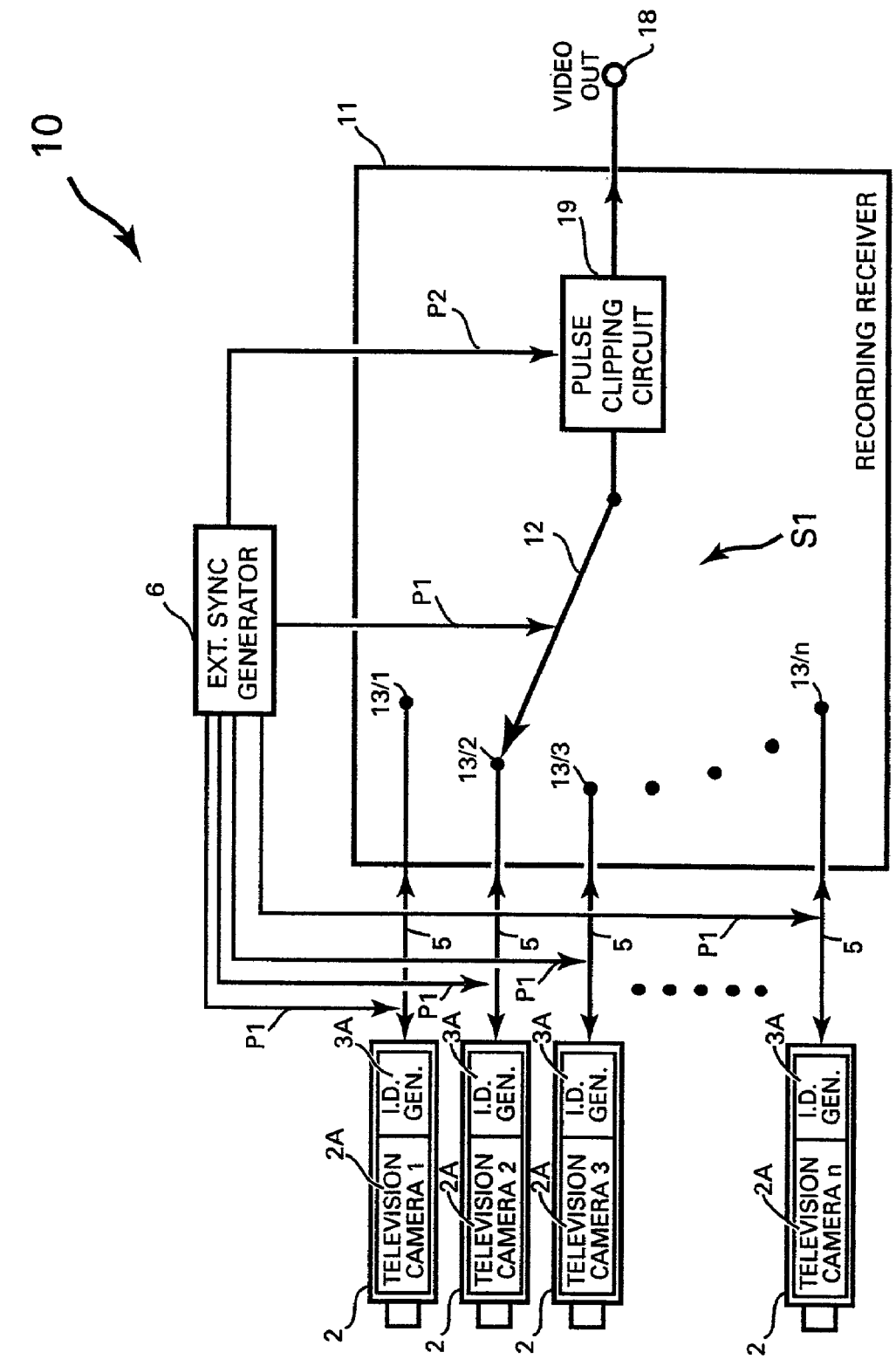
FIG. 2 is a block diagram showing an electric circuit of a receiver including a known externally synchronizing television camera incorporating a known identification code generating circuit of the preferred embodiment.

Referring to FIG. 1, an apparatus 1 for processing, digitally recording, and retrieving a plurality of video signals comprises an external synchronizing signal generator 6, a plurality of transmitters 2 incorporating television cameras 2A synchronized by the external synchronizing signal, and generating a video signal corresponding to the images picked-up by the television cameras, a plurality of identification code generators 3A for generating into each video signal generated by the transmitters 2 a code signal allotted to each transmitter, and a recording receiver 11 for receiving and outputting video signals. The recording receiver 11 of the receiving means 10 incorporates a switch S1 as shown in FIG. 2, for connecting sequentially in rotation the transmitters 2 to a video out terminal 18 at a predetermined rate and time. Synchronizing pulses fed from the ext.sync generator 6 are injected into each of video transmission lines 5 for transmitting the external synchronizing signal to the television cameras 2A, a digital video recorder 30 for recording and playing back video signals is connected through its input terminal 31 to the sequencing video signals generated by the transmitters 2; a code select circuit 39 is provided for setting the time and date of the recording and/or a code commensurate with a code allotted to the transmitters 2, and a monitor 60 is provided for displaying an image corresponding to retrieved video signal.

Figure 9:
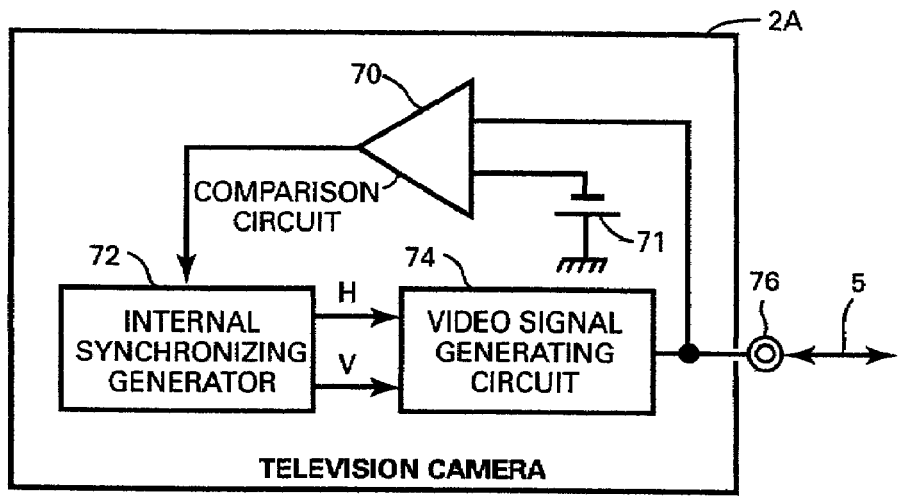
FIG. 9 is a block diagram of an electric circuit of a television camera with a well known external synchronization circuit.

As shown in FIG. 9, the television camera 2A is a well-known television camera synchronized by a synchronizing pulse having a level higher than the white level of a composite video signal, as described in U.S. Pat. No. 4,603,352, the contents of which are incorporated herein by reference.

The frequency of the external synchronizing signal commensurates with the frequency of the vertical scanning frequency of the video signal outputted from the transmitter 2. The frequency of the external synchronizing signal may be either of a frame scanning frequency or a field scanning frequency, for example, in case of NTSC system the vertical synchronizing signal frequency is 60 Hz, therefore, the field frequency is 60 Hz and the frame frequency is 30 Hz.

Figure 12A:
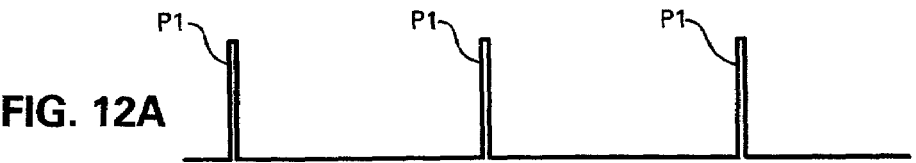
FIGS. 12A to 12D shows a diagram of an electric signal waveform.

As shown in FIG. 12A, the time of the external synchronizing signal P1 is generated adjoins the vertical synchronizing pulse, occurring during the vertical blanking period of the video signal transmitted from the television camera 2A shown in FIG. 9. Thereby, the external synchronizing signal P1 can be fed to the television camera 2A and through the camera transmission line 5 that propagates the video signal without affecting the video signal. The voltage level of the external synchronizing signal P1 is preferably made higher than the video signal. However, the voltage level of the external synchronizing signal P1 may be lower than the video signal or have a reversed polarity.

In the following description, a frame external synchronizing pulse having a voltage level higher than the white level of the video signal, in particular, a frame external synchronizing pulse corresponding to the phase of a second field is used as the external synchronizing signal P1.

Accordingly, the television camera 2A (FIG. 9) comprises a comparison circuit 70 for comparing the voltage level of the vertical frame or field synchronizing pulse, fed from external synchronizing signal generator 6 through the video transmission line 5 to a reference voltage 71, and generating a pulse signal when a frame or a field synchronizing pulse is equal or higher than the reference voltage, an internal synchronizing signal generator 72 for receiving the pulse signal outputted from the comparison circuit 70 and generating an internal synchronizing signal synchronized with the received pulse signal, and a video signal generating circuit 74 for generating video signal.

One terminal of the comparison circuit 70 is connected to the video transmission line 5, and the other terminal of the comparison circuit 70 is connected to a reference voltage source 71. The reference voltage of the reference voltage source 71 has a level higher than the white level of the video signal, preferably a level approximately equal to the synchronizing pulse level.

The internal synchronizing signal generator 72 generates horizontal and vertical synchronizing signals synchronously with the pulse signal outputted from the comparison circuit 70, synchronizing the video signal outputted from the video signal generating circuit 74 through the terminal 76 to the video transmission line 5.

Figure 3:
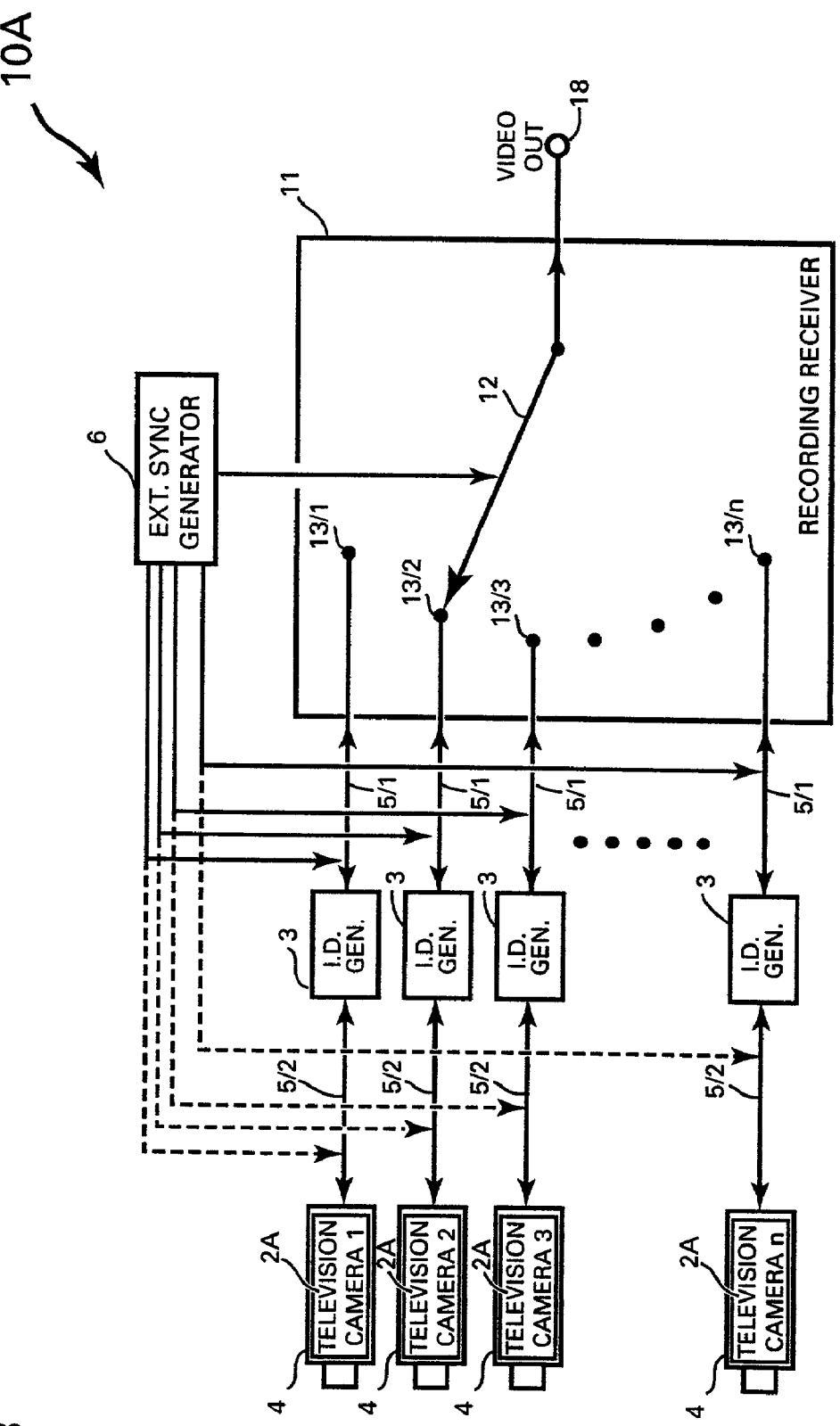
FIG. 3 is a block diagram showing another electric circuit of an embodiment of the receiver with identification code generating circuits separated from the television cameras.

The synchronizing generator 6 of the receiving means 10A shown in FIG. 3 injects the frame or field external synchronization pulses into the video transmission lines 5/1, connecting the identification code generators 3 with the inputs 13/1~13/n of the switch S1; however, it can be injected into the video transmission lines 5/2, and as will be explained, regardless of the locations of where the identification code signals are injected into the video transmission lines, it is possible to inject the external synchronizing pulses anywhere along the video transmission lines, or at the inputs of the switch S1 of the receiving means 11.

When the identification code generators 3 are placed at the side of the switch circuit S1 then it is possible to inject the frame or field external synchronizing pulses into the video transmission lines junction 5/2, thereby, effectively feeding the frame or field external synchronizing pulses directly to the input terminal of the comparison circuit 70.

Figure 10:
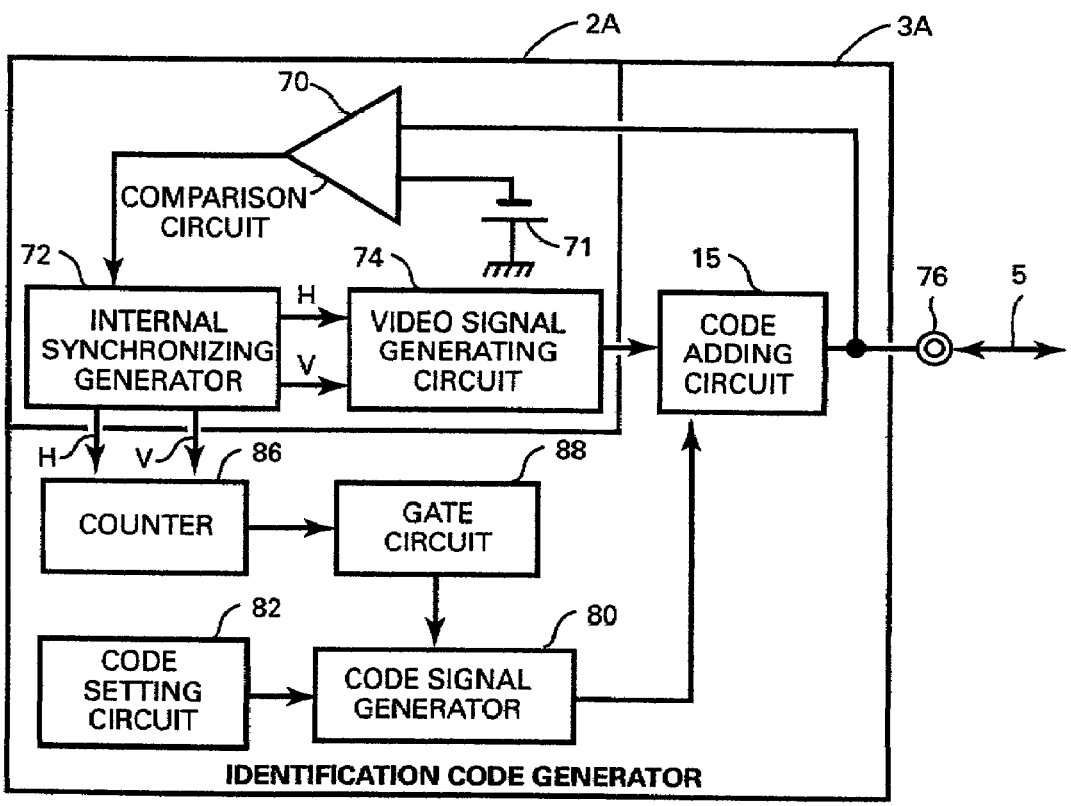
FIG. 10 is a block diagram showing an electric circuit of a television camera with an identification code generator of a preferred embodiment of the present invention.

Similarly, if the identification code generators 3 are placed inside the transmitter 2 as shown in FIG. 1, the terminal of the comparison circuit 70 shown in FIG. 10 is connected directly to the video transmission line 5, through terminal 76.

Figure 11:
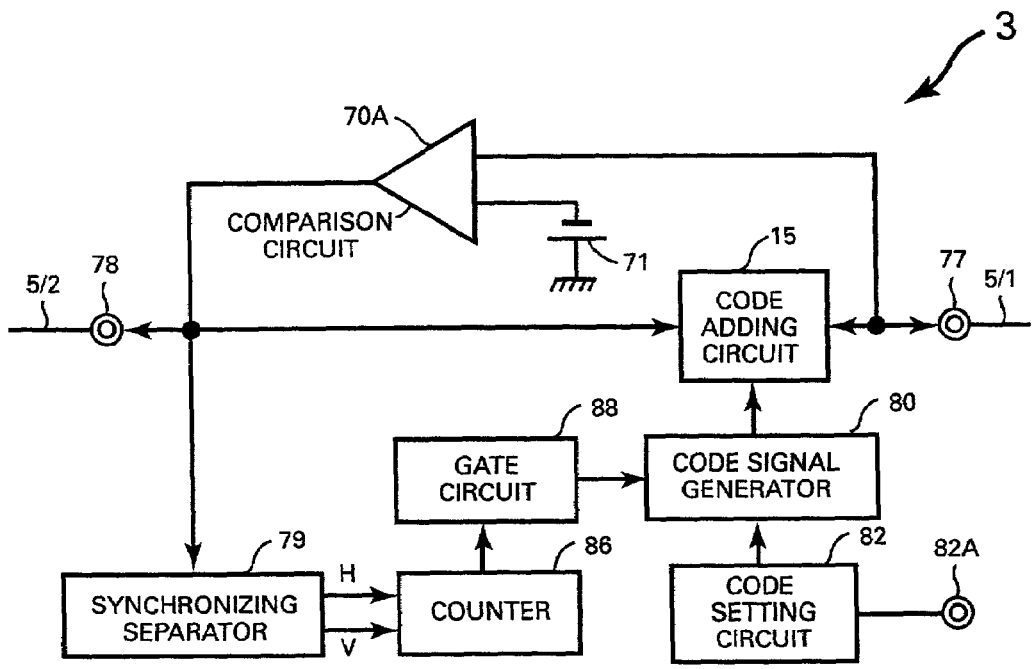
FIG. 11 is a block diagram showing another embodiment of the identification code generator circuit of the present invention.

When the identification code generators 3 are disposed along the video transmission line 5, and the external synchronizing pulses are fed to the transmission line 5/1, a comparison circuit 70A shown in FIG. 11 is placed across the identification code generator 3 for transferring the external synchronization pulses from the terminal 77 of the code generator 3, connected to the transmission line 5/1 side, to the terminal 78 connected to the television camera 2A via transmission line 5/2.

One input terminal of the comparison circuit 70A is used for comparing the voltage level of the field or frame synchronizing pulse received from the external synchronizing signal generator 6 through the video transmission line 5/1 and through terminal 77 to a reference voltage 71, and regenerating a pulse signal when the synchronizing pulse is equal or higher than the reference voltage. The other input terminal of the comparison circuit 70A is connected to a reference voltage source 71, having a voltage level higher than the white level of the composite video signal, preferably a level approximately equal with the synchronizing pulse level.

The output terminal of the comparison circuit 70A is connected to video transmission line 5/2 through terminal 78 for outputting the regenerated pulse, thereby, the comparison circuit 70A is effectively a by-pass or transfer circuit for transferring the field or frame synchronizing pulse across the identification code generator 3 to the transmitter 2, enabling to dispose the identification code generator anywhere along the video transmission line 5.

Since the internal synchronization generator 72 is synchronized with the injected external frame of field synchronizing pulse, the synchronizing pulse presence on the video transmission line 5 is within the period corresponding to the vertical blanking interval of the video signal. In this step, the external frame or field synchronizing pulse is transmitted by the use of the transmission line for the video signal without affecting the video signal transmitted from the television camera.

However, to avoid an input signal level error it is preferable to remove signal levels that are larger than the white level of the video composite signal from the video signal reaching the output terminal 18 of the recording receiver 11 or the digital recorder 30.

Figure 12B:
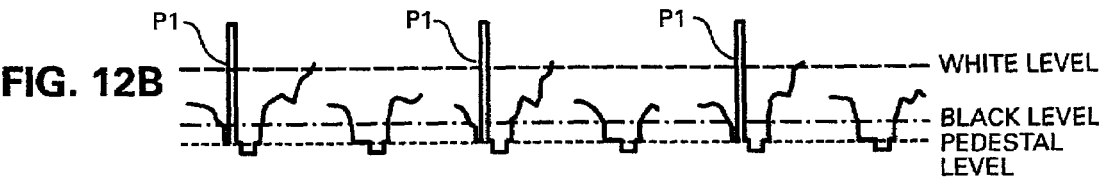
Figure 12C:
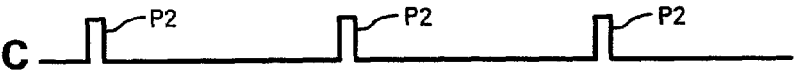

The external synchronizing generator 6 shown in FIG. 2 generates and two pulse signals P1 and P2, corresponding to a predetermined rate, width and level, as shown in FIGS. 12A and 12C.

The phase of the pulse signals P1 and P2 correspond to the vertical blanking interval of the video signal, as shown in FIG. 12B, and, at the same time, the pulse signals P1 and P2 are shown having a frame rate, i.e., generated every second vertical field synchronizing signals. Further, the frame synchronizing pulse signal P1 has a level higher that the white level of the video signal, as shown in FIG. 12B and as the pulse P1 is injected into the video transmission lines 5, the video signals fed to the switch inputs 13/1~1/3n results in a signal shown in FIG. 12B, showing that the pulse signal P1 is injected within the period corresponding to the vertical blanking interval.

The synchronizing pulse P1 is also inputted to the switch pole 12 for synchronizing the sequencing operation on the basis of the frame or field synchronizing pulses.

Figure 12D:
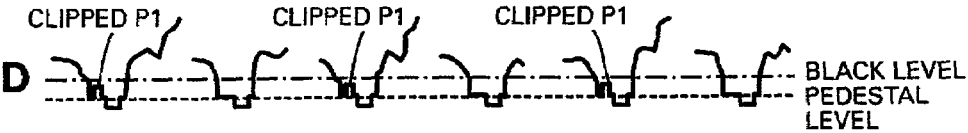

The input of a synchronizing pulse clipping circuit 19 is fed with pulse P2 shown in FIG. 12C for clipping the signal corresponding to the pulse signal P1 within the video signal fed to the output terminal 18 of the receiving means 11, to below or about the black level of the video signal as shown in FIG. 12D. Therefore, the pulse P1 is removed from the video signal fed to the digital recorder 30 through the synchronizing pulse clipping circuit 19, and will not influence the input circuit of the digital recorder 30.

The single synchronizing pulse clipping circuit 19 shown in FIG. 2 is provided for clipping the synchronizing pulse P1 from a signal fed from any of the video transmission lines 5 through the output of the selector S1 by using the timing signal P2 to clip the pulse P1 and output a video signal containing no synchronizing pulse P1. Alternatively, a plurality of synchronizing pulse clipping circuits 19 can be placed at the inputs 13/1~13/n of the switch S1 each fed with the signal shown in FIG. 12B from the respective information transmission line 5 and the timing signal P2 shown in FIG. 12C, thereby clipping the entire signal portion of the signal fed to the input terminal 13/1~13/n above the black level of the video signal during the period of signal P2. Since the duration of P2 covers the period of the external synchronizing pulse P1 the external synchronizing signal P1 will be removed by the clipping circuit 19 from the video signal fed to the recording receiver 11. Though the pulse P2 shown in FIG. 12B is a positive pulse any other pulse size and polarity that is timed to coincide with pulse P1 12(A) can be used to activate the clipping circuit 19 shown in FIG. 2.

Accordingly, even though the external synchronizing signal P1 is present in the video signal fed from the television camera 2A through the transmission line 5 it is removed by the clipping circuit 19, therefore the external synchronizing signal P1 injected into the information transmission line 5 will synchronized the television camera 2A and will not cause any receiving error at the recording receiver 11.

Instead of injecting the synchronizing pulse into the transmission lines the frame synchronizing pulse signal P1 may be outputted directly to the comparison circuit 70 of the television camera 2A.

In case the television camera 2A is not provided with the comparison circuit 70, the pulse signal P1 or P2 may by outputted to the internal synchronizing generator 72 of the television camera 2A. In the latter case, the synchronizing pulse injection and the synchronizing pulse clipping circuit 19 are not needed.

In case the television camera 2A is synchronized by the known horizontal and vertical synchronizing signal, or by a composite synchronizing signal known as GENELOCK, or the horizontal and vertical drive signals, or the vertical drive signal, a generation circuit for the horizontal and vertical synchronizing signals, or composite synchronizing signal, or the horizontal and vertical drive signals or the vertical drive signal may be disposed, instead of the synchronizing pulse generator 6. In this case, the synchronizing pulse injection and the synchronizing pulse clipping circuit 19 are not needed.

Figure 5:
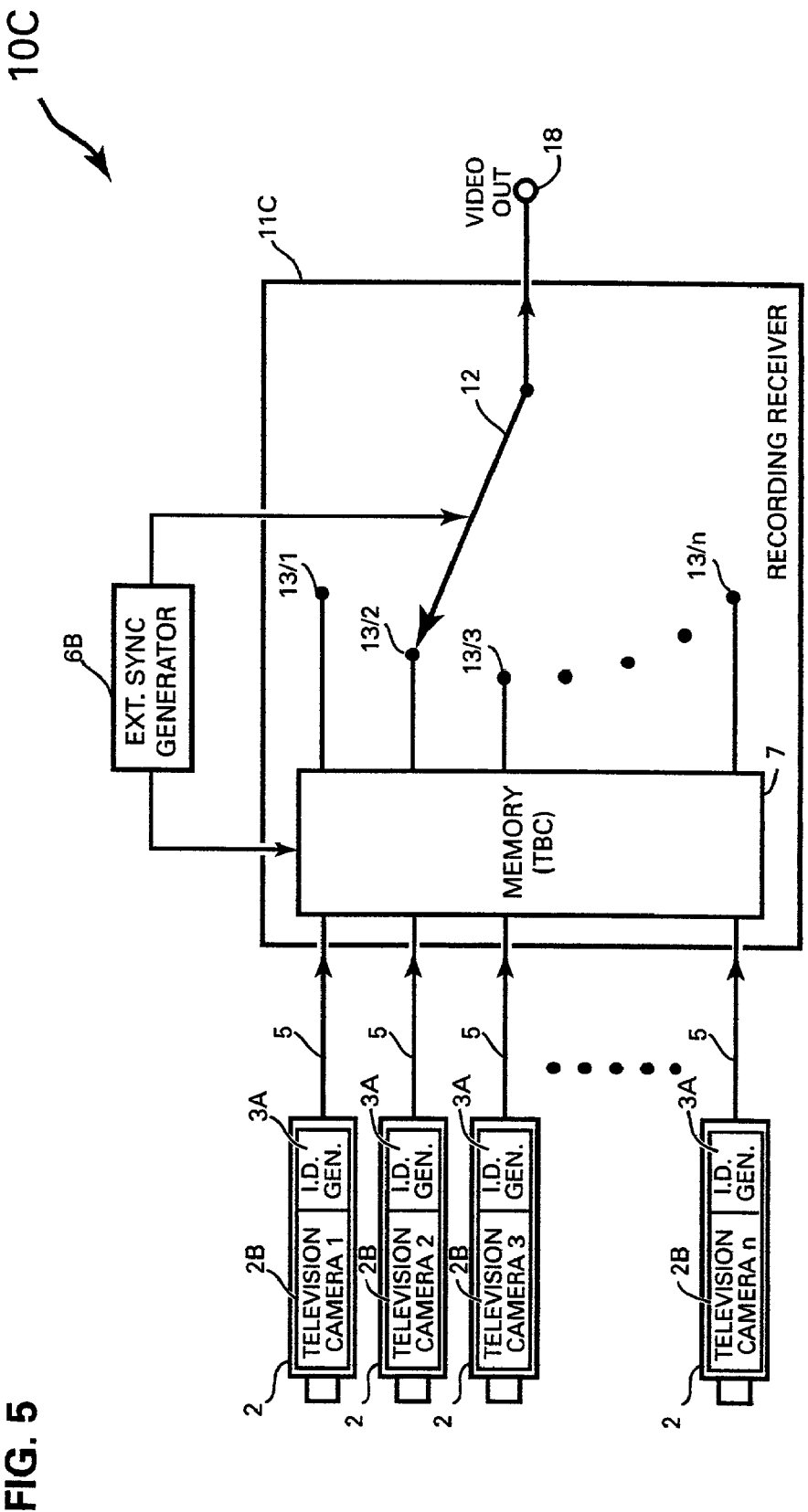
FIG. 5 is a block diagram showing an electric circuit of another preferred embodiment of the receiver incorporating a time base corrector and cameras incorporating respective identification code generating circuits.
Figure 6:
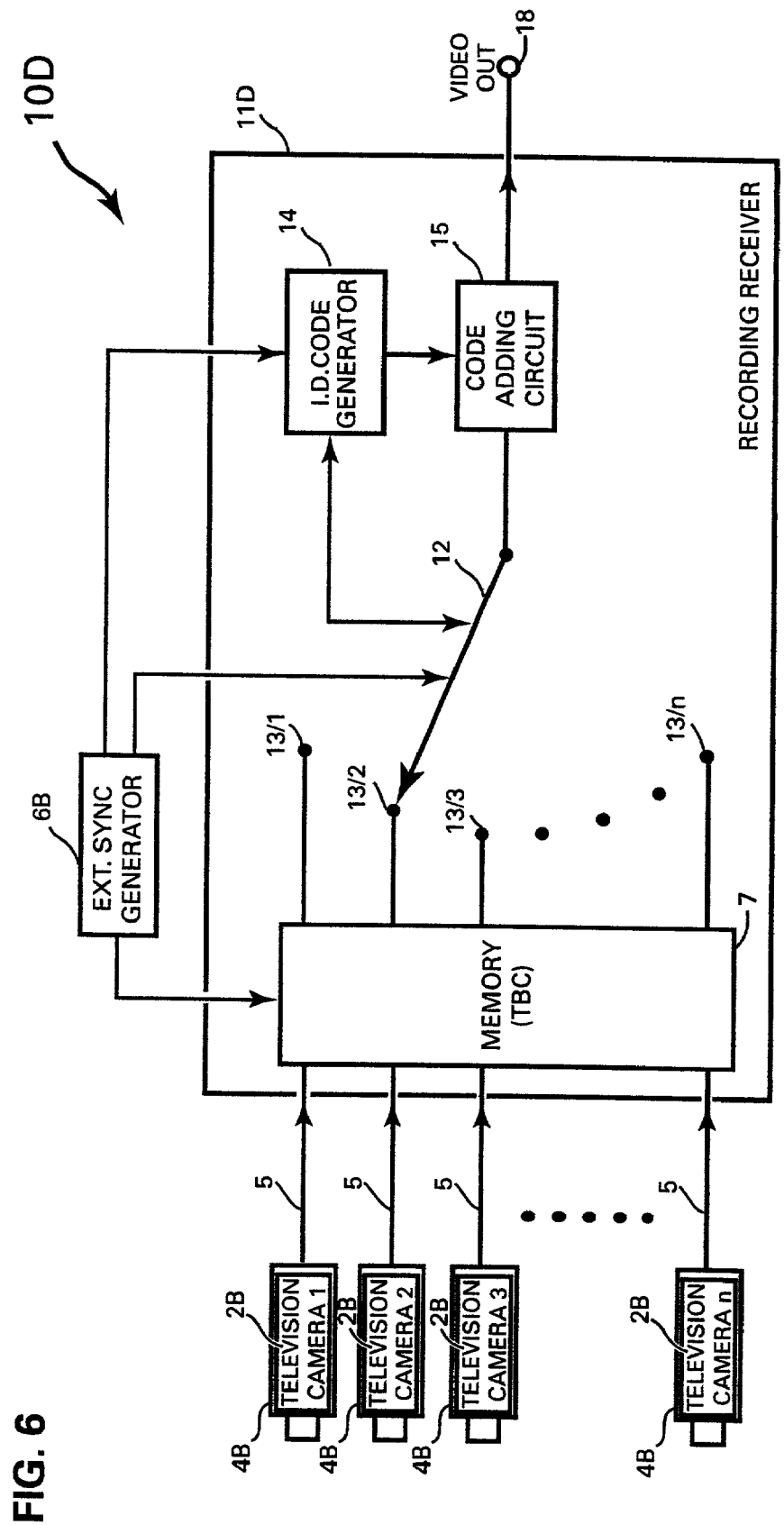
FIG. 6 is a block diagram showing another preferred embodiment of the receiver incorporating the time base corrector and with an identification code generating circuit within the receiver.

Moreover, according to the present invention, it is possible to connect non externally synchronized cameras 2B for processing, digital recording and retrieving signal, by using for example, a well known time base corrector 7 that may include a frame or field memory circuit disposed at the inputs 13/1~13/n of the switch circuit S1 as shown in FIGS. 5 and 6, whereby, the time base corrector and/or the frame or field memory circuit will store at least one vertical scanning period of the video signals generated by transmitters 2 or 4 and retrieve the stored video signals for outputting the signals to the switch S1 in concert with the sequencing rate, on the basis of the synchronizing signal generated by the synchronizing generator 6B, thereby providing a smooth switching from one television camera to another. The memory circuit or circuits of the time base corrector 7 will regenerate the fields or frames of the video signals fed by the transmitter 2 or 4, synchronously on the basis of the external sync signals and repeatedly with every sequencing cycle, and feed the synchronously regenerated video signals to the switcher input terminals 13/1~13/n.

It should be noted that the parts of the television camera and the synchronizing signal generator and/or the time base corrector which are known have not been described in detail herein because they are disclosed in the referenced patents.

As shown in FIGS. 10 and 11, the identification code generators 3 and 3A respectively incorporate a counter 86 for counting the number of the horizontal scanning lines. The adder input of counter 86 receives the horizontal synchronizing signal, generated by the internal synchronizing signal generator 82, and the clear or reset input of the counter 86 receives the vertical synchronizing signal generated by the internal synchronizing signal generator 82, thereby, the counter 86 counts the number of the horizontal scanning lines every field or frame of the vertical scanning period of the television camera 2A or 2B. The output of counter 86 is fed to a gate circuit 88.

The identification code generator 3 shown in FIG. 11 incorporates a synchronizing separator 79 for separating the internal synchronizing signal generated by the television camera 2A or 2B and transmitted through the video transmission line 5, for outputting the horizontal synchronizing pulses and the vertical synchronizing pulses to the counter 86. Therefore, the identification code generator 3, shown in FIG. 11 can be placed along the video transmission line, remotely from the television camera 2A. If a non-external synchronized camera 2B is used then the comparator circuit 70 and the reference 71 shown in FIGS. 9 and 10 are not needed and are not used.

The gate circuit 88 outputs a gate signal to the code signal generator 80 only when the count number in the counter 86 remains at a predetermined value, for a duration of at least one horizontal scanning line period. It is preferable that the predetermined value of the counter number is within the vertical blanking period, for example, in the NTSC system the first 21 horizontal scanning lines are within the vertical blanking period, therefore, it is preferable that the gate signal, generated by the gate circuit 88 is outputted for any predetermined number of horizontal scanning lines, within, for example, the 9th to the 20th horizontal scanning lines of one vertical scanning period.

The code signal generator 80 is connected to a code setting circuit 82 for setting the camera identification code; therefore, the code generator 80 outputs a code signal corresponding to the identification code, set in the code setting circuit 82, to a code adding circuit 15 when the gate signal is received and for the duration of the gate signal.

The identification code set in the code setting circuit 82 is individually allotted code to each of the transmitters 2, to identify the video signal generated by the corresponding transmitter 2. Identification code such as numbers, "1", "2", "3" . . . "n", can be used as camera identification code, respectively.

An apparatus for generating code signals and a circuit for injecting code signals into the video signal is disclosed in U.S. Pat. No. 4,943,864, the contents of which are incorporated herein by reference, therefore, each of the information signals received by the digital recorder 30 incorporates identification code.

Figure 15A:
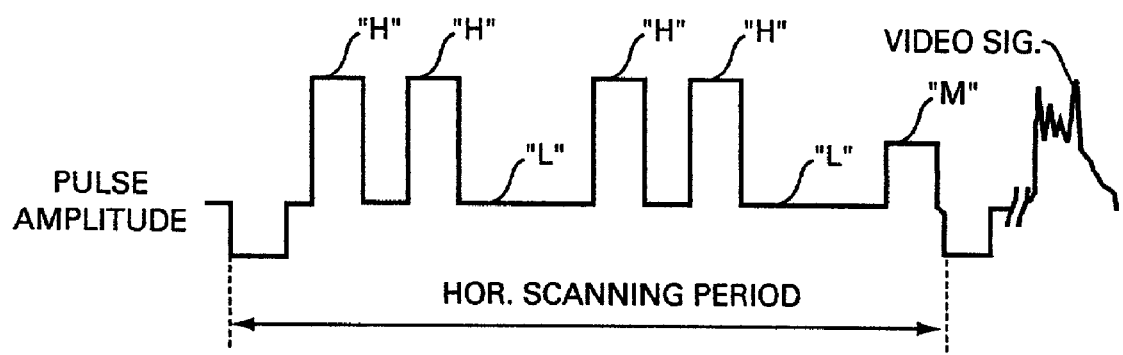
FIGS. 15A–15C show a diagram showing an electric code signals waveforms.
Figure 15B:
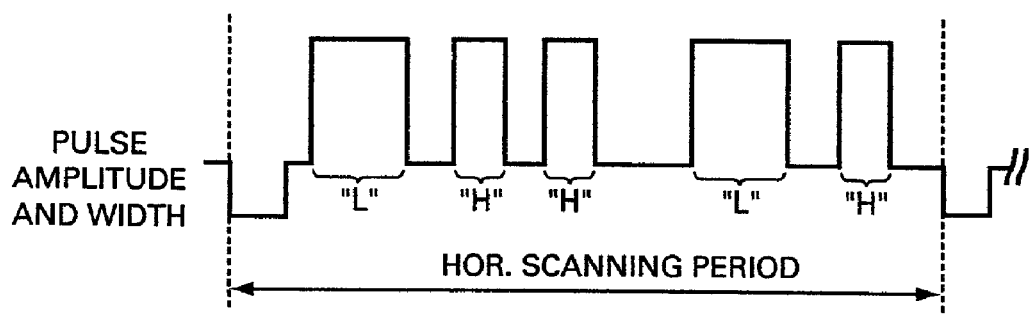

The code signal is a binary code or a bar code signal having two or more levels, composed of a high level or white, which is the maximum level of the picture signal in the video signals, a low level or black, which is lowest level of the picture signal, and a median level or gray, which is the mid level of the picture signal in the video signal, generated by the television cameras 2A or 2B as shown in FIG. 15A; the identification code may be a combination of pulse signal levels and varying pulse widths as shown in FIG. 15B.

Figure 15C:
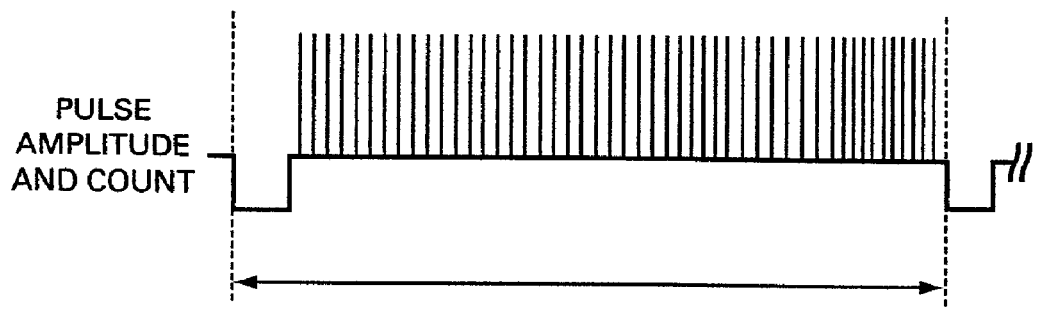

Alternatively, the code signal may be either a sine-wave signal or a pulse signal having a frequency corresponding to the identification code, and the sine-wave or the pulse signal is generated during one or more horizontal scanning period as shown in FIG. 15C, preferably, during the vertical blanking period.

The code adding circuit 84 superposes the code signal fed from the code signal generator 80, into the video signal fed from the corresponding television camera 2A or 2B, and then outputs a signal composed of the code signal superposed in the video signal, to the video transmission line 5, through the terminal 76, to be connected to the input of the switch circuit 13/1~13/n.

The switch S1 of the recording receiver 11 connects in sequence and in synchronized rotation the transmitters 2 to the digital recorder 30 through the synchronizing pulse clipping circuit 19, on the basis of the external synchronizing signal generated by the external synchronizing signal generator 6; therefore, the transmitters 2 are connected in sequence and in rotation to the digital recorder for at least one vertical scanning period of the video signal.

The switch S1, may be an electronic switching circuit using well known switching technic by employing readily available ICs, or by employing discrete circuit using transistors, resistors and diodes. The switching timing can be controlled by separating the synchronizing signals from the video signals by well known sync separators and controlling the switching timing on the basis of separated synchronizing pulses, or controlling the switching timing by the field or frame pulse generated by the external synchronizing generator 6.

Figure 4:
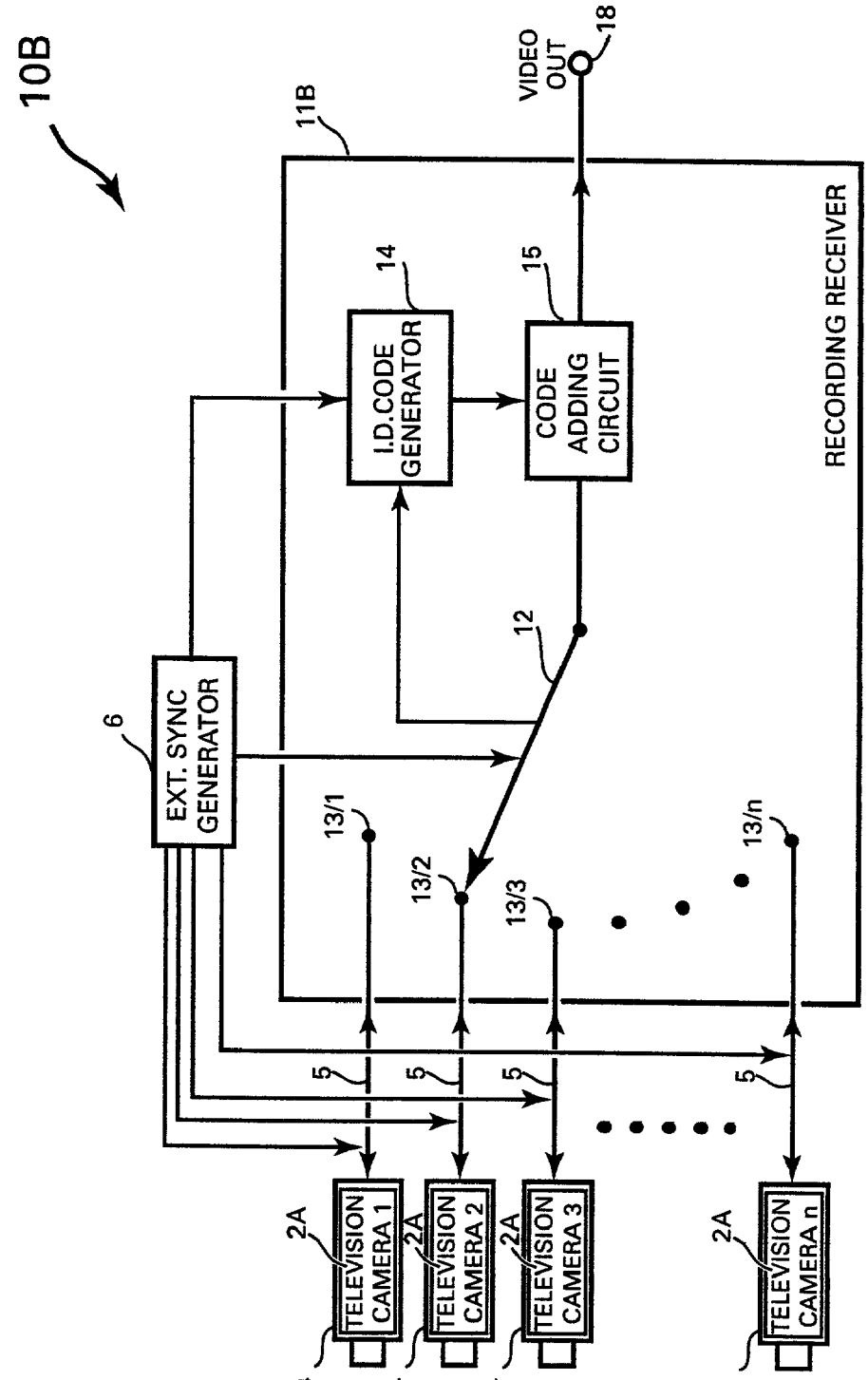
FIG. 4 is a block diagram showing an electric circuit of yet another embodiment of the receiver with an identification code generating circuit within the receiver.

The receiving means 10B and 10D of FIGS. 4 and 6, respectively, comprising the recording receivers 11B and 11D and transmitters 4 and 4B, respectively, incorporate an identification code generator 14 and a code adding circuit 15 which are essentially identical to the identification code generator 3 with the exception that a range of preprogrammed codes are inputted into the code setting circuit 82 shown in FIG. 11 and in accordance to data fed from the switch pole 12 via terminal 82A, the code setting circuit will generate an individual code in accordance with the pole 12 position, i.e., to which input it is connected, for feeding one of the preprogrammed codes through the code adding circuit 15 to the video signal; therefore, each individual sequencing signal will be added with an individual identification code, allotted to the individual transmitter 2 connected to an input 13/1~13/n of the switch S1.

Figure 7:
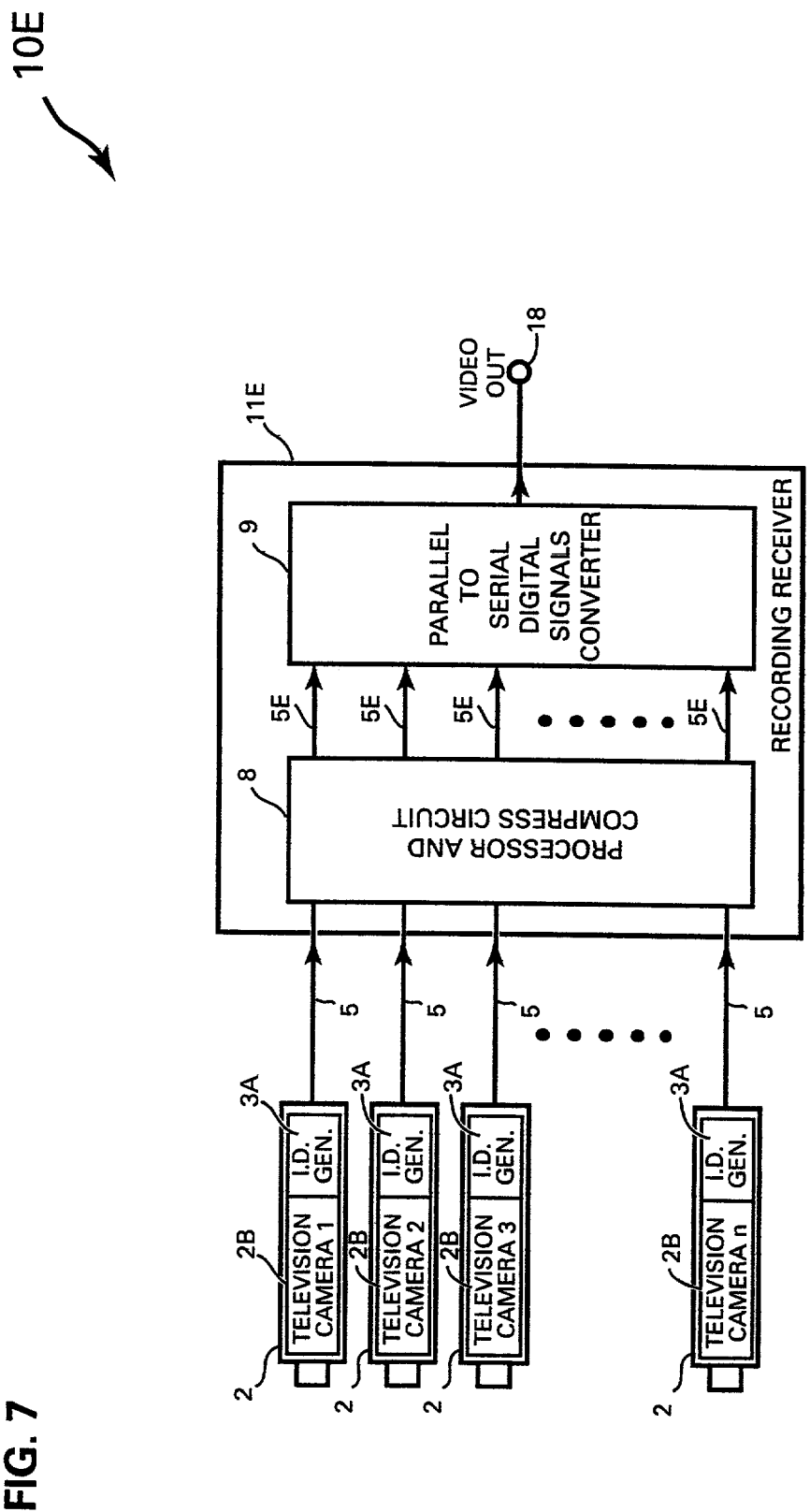
FIG. 7 is a block diagram showing an electric circuit of the receiver with a parallel processing circuit and including a known television camera incorporating an identification code generating circuit of the preferred embodiment.

The plurality of transmitters 2 connected to the recording receiver 11E of the receiving means 10E shown in FIG. 7 are not externally synchronized and each television camera 2B feeds the video signals including the identification codes to the processor and compress circuit 8 through the transmission lines 5. The processor and compress circuit comprises a well known circuit that receives, processes and compress a video signal and feeds a digitally compressed video signal, such as the well known JPEG, MPEG, MPEG2 or similar and the digitally compressed signals are outputted individually and fed through the connecting lines 5E to a well known parallel-to-serial converter 9 and the serially outputted, digitally compressed signals are fed through the video out terminal 18 to the digital recorder 30 for storing the digitally compressed signals, along with the time and date and the identification numbers of the processed camera signals.

For identifying the identification code the processor and compress circuit 8 further comprises a code extractor circuit 100 shown in FIG. 13. The code extractor circuit receives the video signal through terminal 101 and feeds the received signal to a synchronizing separator 102 and to a gate circuit 106. The synchronizing separator feeds the horizontal and vertical sync to a sync counter 104 that counts the horizontal lines to a predetermined value or values in the same way the counter 86 of FIG. 11 counts the horizontal lines and feeds gate-on signal to the gate circuit 106 during the predetermined counted horizontal line or lines for switching on the gate circuit 106 to pass the video signal to a level sensor 108. The level sensor 108 thereby is fed with the video signal portion that contains the coded identification for detecting its envelope or shape and outputting the extracted code through an output terminal 109 to be processed by the processor and compress circuit 8.

Figure 8:
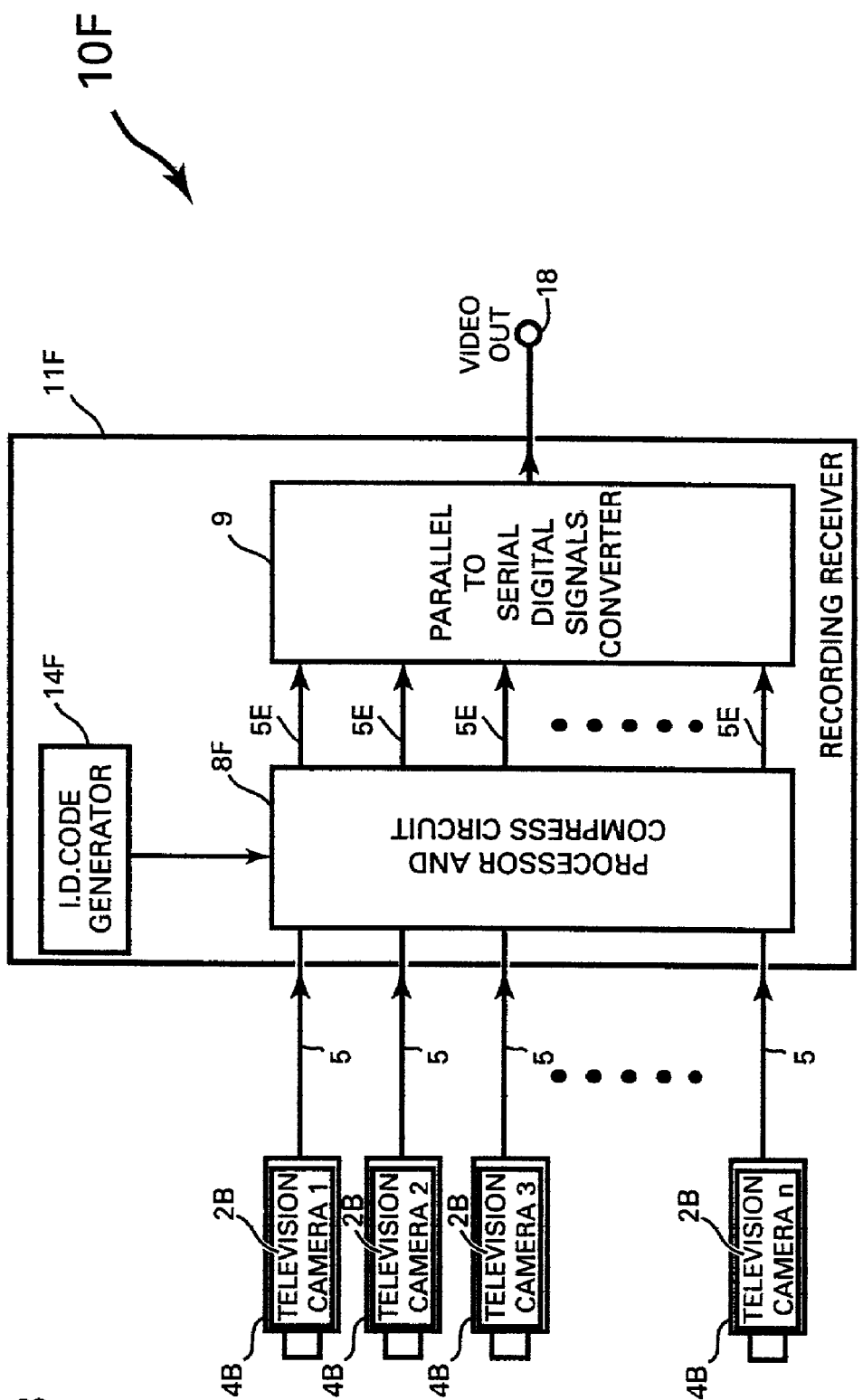
FIG. 8 is a block diagram showing yet another electric circuit of receiver of the preferred embodiment with a parallel processing circuit and with an identification code generating circuit within the receiver.

The plurality of transmitters 4B of the receiving means 10F shown in FIG. 8 contain no identification code generator and similarly to the transmitters 2 of FIG. 7, the television cameras of the transmitters 4B are not externally synchronized and they output video signals without identification codes to the processor and compress circuit 4B. A well known digital processor 8F is fed separately by an identification code generator 14F with preprogrammed identification codes assigned to each of the transmitters 4B and it processes the identification codes along with the compressing of the video signals, such that each individual compressed signal is fed with the identification code to the input of the parallel-to-serial digital converter 9.

The parallel to serial digital converter of the recording receiver 11F shown in FIG. 8 feeds to the digital recorder 30 with serially sequencing compressed signals the same way the parallel to serial converter 9 of the recording receiver 11E does.

It becomes obvious that any of the receiving means 10, 10A, 10B, 10C, 10D, 10E and 10F will output sequencing synchronous or compressed serial video signals and each of the individually sequencing signals incorporates an allotted identification code number for recording, storing and retrieving the signals on the basis of the signal identification code.

Figure 16:
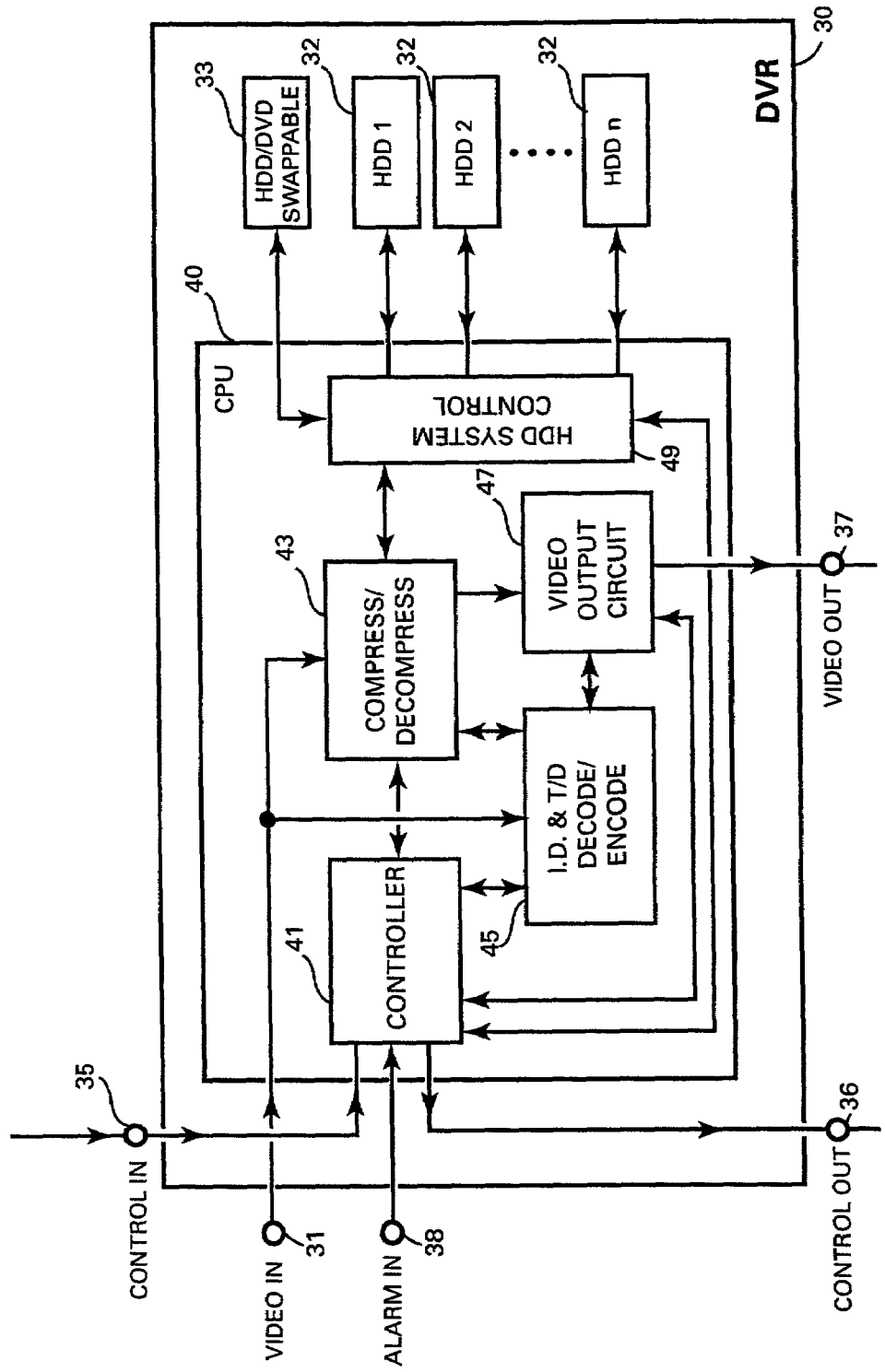
FIG. 16 is a block diagram of an electric circuit of the digital recorder of the preferred embodiment of the invention.

The digital video recorder 30 shown in FIG. 16 comprises a CPU (Central Processing unit) 40 comprising a well known microprocessor circuit or a personal computer (PC), one or more memory storage devices, such as the well known HDD (Hard Disk drive) 32 and at least one removable or swappable memory storage device 33, such as HDD or the well known DVD disk or CD disk drive.

The CPU 40 comprises a well known compress/decompress circuit or software package 43 for compressing the video signal fed to digital recorder through its video input terminal 31 employing any one of the well known compression formats such as JPEG, MJPEG, WAVELET, MPEG, MPEG1, MPEG2, MPEG4 or similar format and for feeding the compressed signals along with the time and date and the identification code of the processed signal to the HDD 32 memory storage devices through an HDD system control 49.

The well known HDD system control, using hard disk management software, such as used with personal computer (PC), manages the HDD 32 drives, so as to feed the HDD 32 to its maximum capacity and when more than one HDD 32 are employed, to feed all the HDD 32 drives one after another, each to its maximum capacity. When the last HDD32n is full with no capacity left to continue the recording, the HDD system control 49 will feed the freshly compressed signal into the first HDD 32 device for storing the freshly compressed signals by removing the oldest stored compressed signals, in a rotation known as FIFO (First In First Out).

Whenever an alarm signal is fed through an alarm-in terminal 38 to a controller 41 of the CPU 40 the controller feeds an alarm state command to the HDD system control so as to continue recording and storing the compressed video signals, in a routine FIFO storing manner, and when the alarm is cleared transfer the compressed video signals that were stored during the alarm state, plus n time duration of pre alarm and/or post alarm stored signals to the removable/swappable memory storage device 33. It is preferable that the transfer of the stored compressed video signals to the removable/swappable memory storage device is actually a reproduction or duplication of the stored compressed signals, leaving the routinely recorded and stored signals in its original form, in order not to disrupt the FIFO recording integrity, so as to maintain an undisturbed recording in simple FIFO rotation throughout the time, yet to provide a separate long term or permanent storage means for the alarm state recording, or as selected by the user, the alarm state recording plus an n time of pre alarm and/or post alarm recording.

Similarly to the alarm recording process it is possible to transfer in the same manner any particular recorded event by a manual command through a selector keyboard 39 shown in FIG. 1, or by setting a program for an automatic, timer control command to transfer particular recording during a user selectable time and date and for a user selectable n time duration, etc.

The CPU 40 further comprises a video output circuit 47 for processing a decompressed video signal for superposing time and date, and/or identification code number and/or, name or text and a circuit 45 for decoding/encoding the identification code and/or the time and date and/or the alarm particulars.

The decoding portion of the I.D and T/D decoder/encoder circuit 45 can be a circuit such as the circuit 100 of FIG. 14, wherein the video signals are fed through the input terminal 101 and the extracted code outputted from the output terminal 109 is fed to the controller 41, and to the HDD system control 49 and to the compress/decompress circuit 43 for further processing and for feeding the decoded identification code along with the compressed signal for storage into the HDD memory devices 32.

An encoding circuit portion 90 of the ID and T/D encode/decode circuit 45 shown in FIG. 14 comprises a horizontal sync counter 94 for counting the horizontal lines of the decompressed video signal on the basis of the horizontal and vertical sync pulses fed from the decompress circuit 43 for counting the horizontal line or lines and feeding gate-on signal during a predetermined count of horizontal line or lines. In the following description, the identification code is injected into single horizontal line 11 or into dual horizontal lines 11 and 12, the time and date are injected into three horizontal lines 14 to 16, and the alarm particulars are injected into single horizontal line 18 or dual horizontal lines 18 and 19. Accordingly the horizontal sync counter 94 counts line 11 or lines 11 and 12 and feeds gate-on signal to the gate 96 for the period of line 11 or lines 11 and 12. The gate 96 transfers during line 11 or lines 11 and 12 the identification code from the code generator 92 to the code adding circuit 98 of the video output circuit 43, and the code adding circuit 98 injects the identification code into the video signal. When the horizontal sync counter 94 counts lines 14 to 16 it generates a gate on command to the gate 96 for transferring a time and date code which can, for example, be a binary number comprising the accumulative number of seconds, with the Jan. 1, 2000 is zero and increasing incrementally with each passing second by one, thereby the seconds count, for example, for Jan. 10, 2001 at 24.00 hr. will be; 375 days×24 hours×60 minutes×60 seconds=32, 400,000 seconds, accordingly, the control unit will feed to the code generator the accumulative number of seconds, of the actual time and date of the recording of the signal and the code generator 92 will convert the number into a binary code, or a bar code, the same way the identification code is generated and will feed the code to the code adding circuit 98 for injecting the time and date code into the video signal, during horizontal lines 14, 15 and 16. When the horizontal sync counter 94 counts the horizontal line 18 or lines 18 and 19 and if the recalled signal was recorded during an alarm state, the controller will feed a preprogrammed data such as the alarm location, its number and other particulars to the code generator which converts the data into binary code, or bar code and feeds the code to the code adding circuit 98 for injecting the alarm particulars during the horizontal line 18 or lines 18 and 19. By such arrangement the output video signal fed from the digital recorder can be propagated freely to a playback receiving stations for displaying a clean pictures, unobstructed by a superimposed text and/or time-date and/or other displays that commonly cover important portions of the displayed picture.

In the preferred embodiment of the present invention, the adding circuit 15 or 98 may include a mixer circuit wherein the code signals are mixed and injected into the video signal. Such mixer circuit is disclosed in U.S. Pat. No. 4,989,085, the contents of which are incorporated herein by reference, or it can be an injection circuit disclosed in U.S. Pat. No. 5,335,014, the contents of which are incorporated herein reference.

As shown in FIG. 14, the code is also fed through the gate 96 to a memory circuit 97 and to an OSD (On Screen Display) circuit 99 of the video output circuit 47. The memory circuit 97 contains the names, text and alarm particulars related to each allotted identification code and to each alarm signal and/or other particulars of the alarm locations etc, for feeding the data to the OSD circuit 99 and upon command received from the controller 41 the OSD circuit 99 switches off, or on for superimposing onto the picture a display of the time/date of the recording, and/or identification number and/or name and/or text and/or alarm details. The control circuit 41 command can be automatically activated during programmed events or during alarms, or can be manually activated through the selector keyboard 39 shown in FIG. 1. Further the memory circuit 97 can be used to store graphics pertaining, such as a location of a camera or of an alarm sensor and feed such graphic data to the OSD circuit 99 for superimposing onto the picture on screen graphic displays.

The selector 39 shown in FIG. 1 can be a keyboard with indicators or with a display such as LCD for generating select command through the control-in terminal 33 and for receiving data pertaining the time and date of the recording, and/or the alarm details and/or the identification number or numbers of the stored and/or the played back signals, etc through the control-out terminal 36.

The controller 41 (shown in FIG. 16) of the CPU 40 using a well known microprocessor circuit updates throughout the time its data, pertaining the time and date of the routinely cascaded and the alarm recordings and thereby can provide through the control-out terminal 36 detailed data of the location of the recorded files within the cascaded HDD drivers 32 as well as access instantly the recorded files for playing back the selected signals upon command.

When the digital video recorder 30 is fed from a receiving means 10E or 10F with digitized, serially compressed signals the CPU will process and transfer the signals directly to the HDD memory means 32 for storage without activating the compress/decompress circuit 43 for the compressing process. The compress/decompress circuit 43 however will be activated for decompressing the stored signals for playing back the signals and outputting decompressed video signal to the video output circuit 47.

Figure 17:
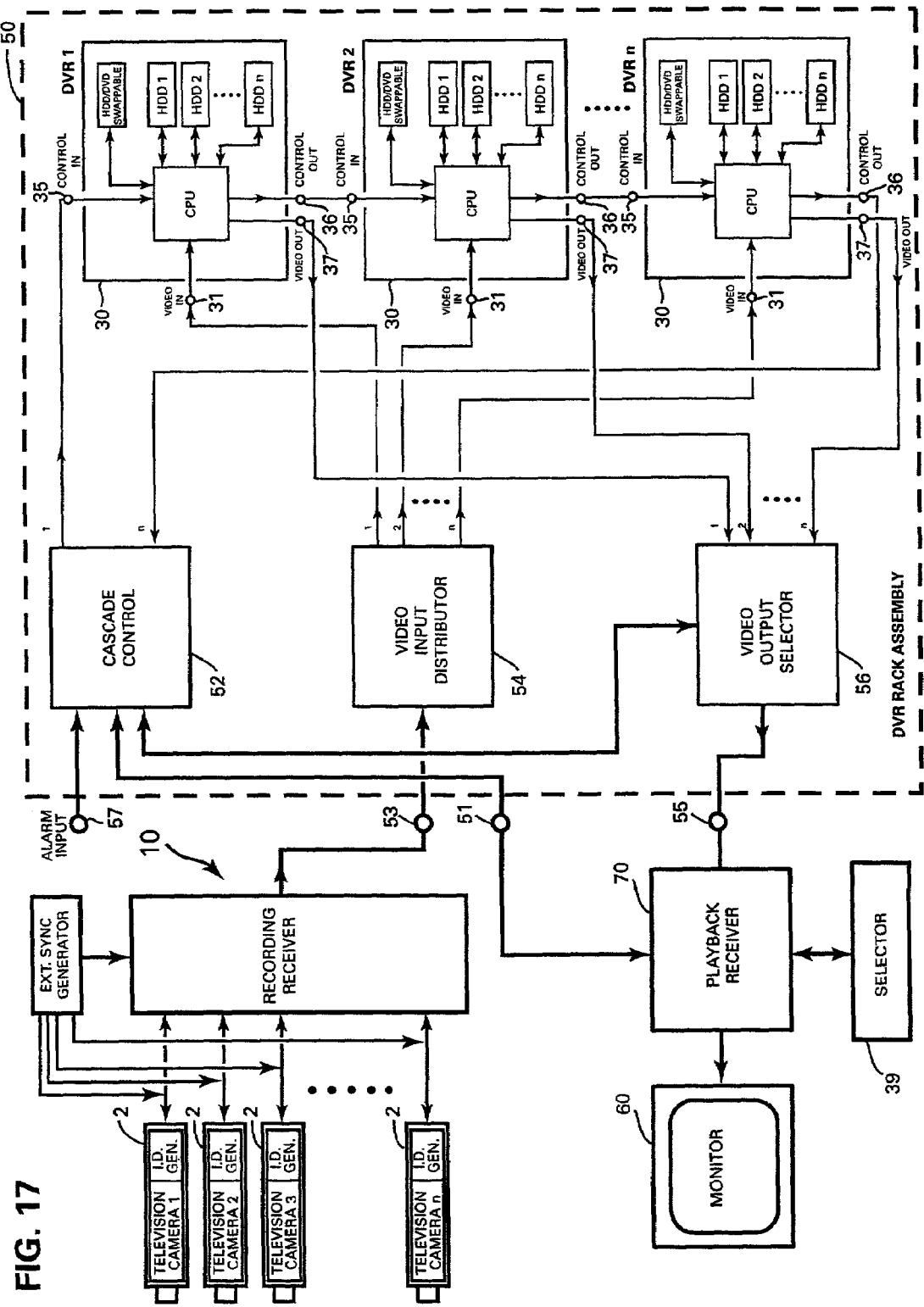
FIG. 17 is a block diagram of an electric circuit showing a cascaded setup of the digital recorder of FIG. 16 in a rack of the preferred embodiment.

Shown in FIG. 17 are n number of digital recorders 30 mounted into a rack 50 for increasing the storage capacity by combining the digital recorders 30 into a cascaded chain wherein a first digital recorder 30 DVR1 is connected via its control-in terminal 35 to a cascade control 52 of the DVR rack 50. The control-out terminal 36 of the DVR1 is connected to control-in terminal 35 of DVR2 and control-out terminal 36 of DVR2 is connected in a cascaded chain to control-in terminal 35 of DVRn. The control-out terminal 36 of DVRn is connected in return to the cascade control 52, completing the closed looped cascaded control connection.

The alarm input terminal 57 of the cascade control 52 replaces the individual alarm connection 38 of each digital recorder shown in FIG. 16.

Each individual video input terminal 31 of each digital recorder is connected to a video distribution amplifier 54 of the DVR rack 50 and each output 37 is connected to the video output selector 56. The input of the distribution amplifier is connected to the output of the receiver of a receiving means 1 shown also in FIG. 1. The output of the video selector 56 is fed to an input of a playback receiver 70A, which is controlled by a selector 39 and feeds its output to a monitor 60. The cascaded control 52 comprises a well known microprocessor and memory circuits for registering the time and date of the on-going cascaded recording of each DVR in the rack, and the time and date of all the received alarm signals and their particulars for addressing and feeding the received alarm signals to the current recording DVR in the cascaded chain and for communicating with the playback receiver 70A while addressing the video output selector 56 for connecting the selected DVR, on the basis of the registered time and date to the playback receiver, for feeding a playback of a serially sequencing signals or a specific camera signal on the basis of the camera identification code.

Figure 19:
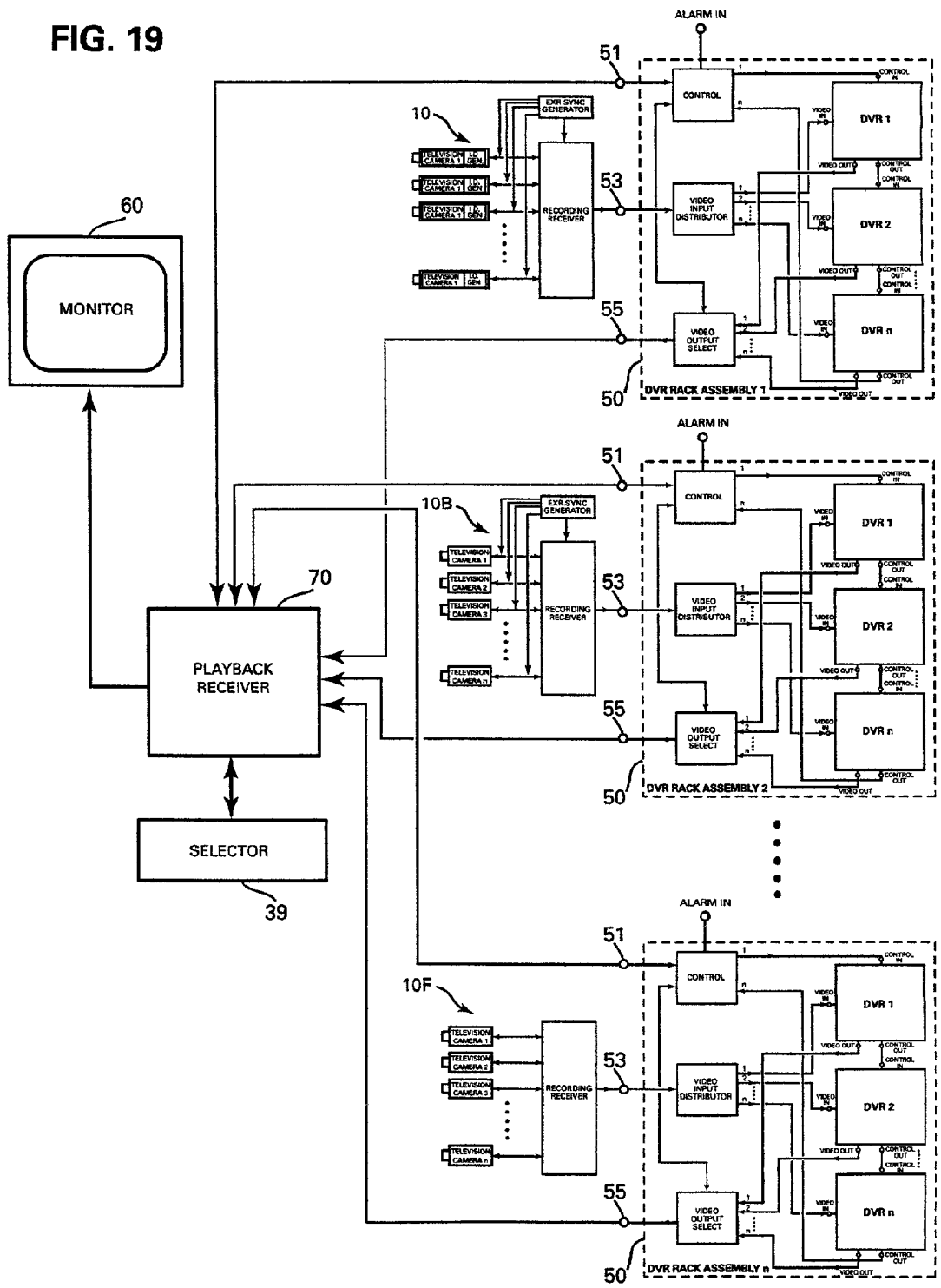
FIG. 19 is a block diagram of an electric circuit showing multi cascaded setup in a large-scale digital recorder of the preferred embodiment of the present invention.

The video distribution amplifier is a well known distribution amplifier for feeding video signals fed from the receiving means 10 and 10B to all the video inputs of the DVRs in the cascade of a rack assembly 50. When recording receivers 11E or 11F of the receiving means 10E or 10F are connected to a DVR rack, such as the receiving means 10F shown in FIG. 19 is connected to DVR rack assembly n, a digital buffer amplifier is used instead of the video distribution amplifier 54.

The cascade control in-out provides for instant addressing to all the CPUs of the DVRs in the cascade and for processing all data and for intercommunicating during a shift in the recording from one fully recorded DVR to next DVR in the cascade, as well for maintaining unified time and date throughout the system. For simplifying the addressing for both, the recording and the playback, each of the DVRs is allotted with exclusive station code or number, thereby expanding the recall to a time and date, and/or the exclusive identification number of the selected camera signal, and/or the selected DVR exclusive station number and/or the alarm particulars.

The selector 39 can also transfer a specific recording or playback commands to the cascade control 52 through the playback receiver 70A, such as, recording transfer command of a selected time and date of a selected camera signal or signals, or playback commands such as fast forward or fast rewind search, or step by step playback of an individual camera signal, on the basis of the identification code and the like.

The cascade control 52 can feed to the playback receiver 70A and/or to the selector 39 data pertaining the particulars of a selected alarm or alarms, the time and date of the recordings, the location of the recording, i.e., the specific DVR or the specific HDD in which the storage is located, etc for superposing such data upon command onto the monitor 60 or to a display panel or to indicators of the selector 39, thereby simplifying the operator's selection process. By this arrangement it becomes obvious that it is possible to use a receiving means 10~10F for generating and feeding multiple, synchronously sequencing video signals, or multiple serially processed compressed video signals each allotted with an identification number to a multiple digital recorders 30 connected in a simple cascade for increasing the overall capacity of the recording system, and playing back any of the recorded signals instantly on the basis of time and date, the allotted identification number or a particulars of an alarm and/or the allotted station code number to the digital video recorders.

Figure 18:
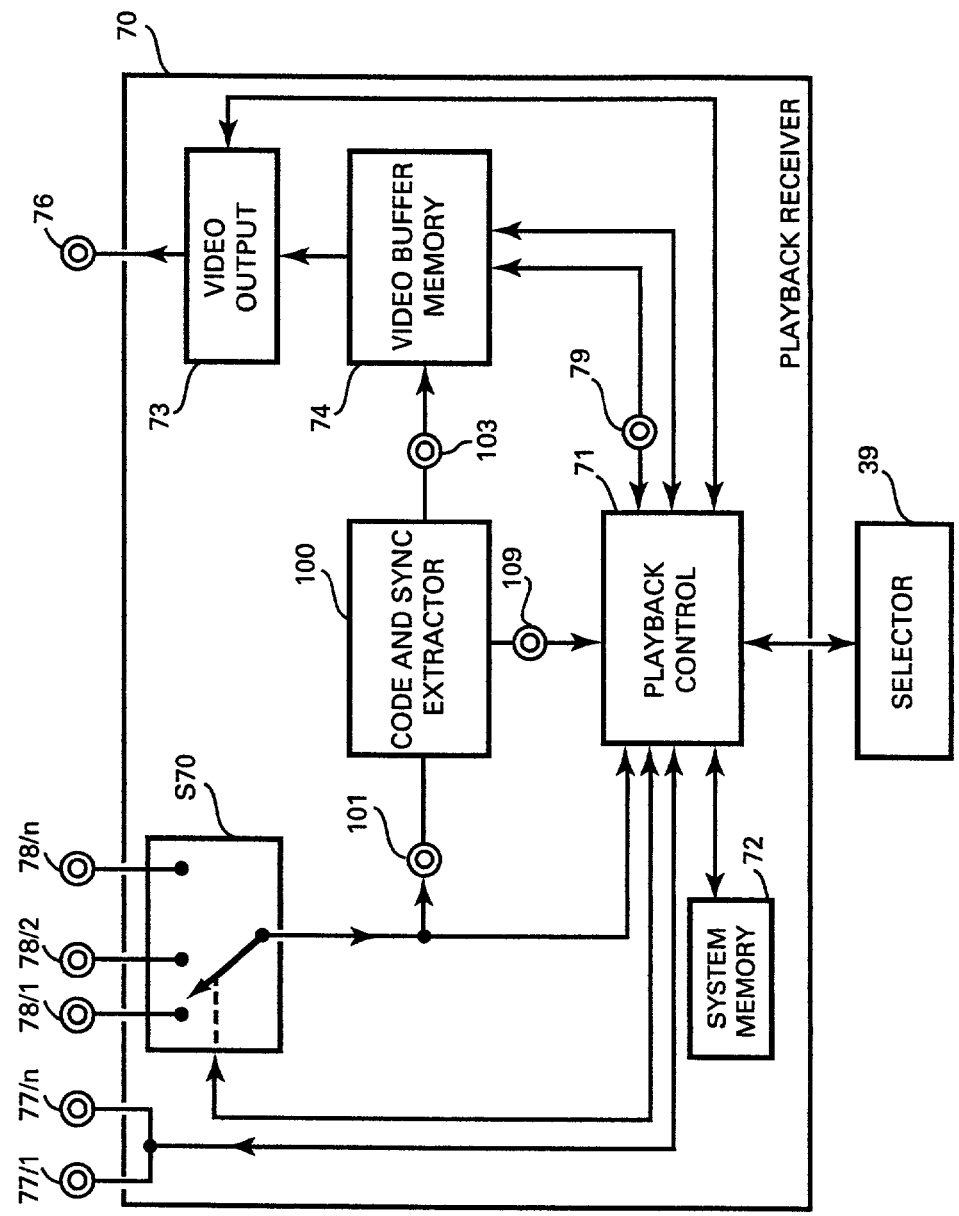
FIG. 18 is a block diagram of an electric circuit showing a playback receiver of the preferred embodiment of the present invention.

The playback receiver 70A shown in FIG. 18 consists of a code extracting circuit 100 shown in FIG. 13 for extracting the identification code from the received video signal through the input terminal 101 and for feeding the extracted identification to a playback control circuit 71. The code and sync extracting circuit 100 further outputs the sync separated by the sync separator 102 of FIG. 13 through the terminal 103 to the video buffer memory circuit 74. The video buffer memory circuit 74 is fed with a selective video or sequencing video signals through the output terminal of the playback control circuit 71, which is fed with played back signals through a selector switch S70. The playback control will generate a selective video signal and feed it to the video buffer memory 74 only when the extracted code, extracted by the code extraction circuit 100 fed to it and the select code fed by the selector 34 are a match code. A match code signal is also fed to the video buffer memory 74 from the playback control for opening the memory input, for freshly inputting or for renewing the storing of a video signal of at least one vertical scanning period of the video signal, fed to the video buffer memory 74 through terminal 79.

Therefore, the match signal generated by the playback control 71 will start a renewed storing by the memory circuit 74 of at least one field or frame of the video signal which is superposed with an identification code that corresponds to the selected code, set by the selector 39.

Since the stored video signal in the memory circuit 74 is renewed only when the match signal is generated by the playback control 71, the video signal generated by the memory circuit 74 for outputting to the video output circuit 73 and monitor 60 shown in FIG. 1, remains same until another match signal is generated by the controller 71, and the memory storage is renewed by a freshly inputted video signal.

Even though the memory signal remains same for one or more fields of frames, the same memorized signal is generated every field on the basis of the separated sync signal fed by the code and sync extraction circuit 100 to the video buffer memory 74.

Therefore, the image appearing on the monitor 60 remains same for a period of one sequencing rotation time, and until the video signal superposed with the same identification code signal is played back by the digital video recorder 30, at which time, a renewed image will appear on the monitor 60.

It is also possible to feed the video buffered memory 74 with multiple camera signals by selecting multiple identification codes through the selector 34 and upon command by the selector through the playback control 71 combine several camera signals into one display such as the well known quad, 9 split or 16 split displays, or the well known picture in picture displays, etc. Further, as it is possible to recall a specific single camera signal through the digital video recorder 30 it is not necessary to process such individual played back signal through the video buffer memory 74, and therefore upon command generated by the selector 34 for selecting a playback that requires no additional processing by the video buffer memory 34 the playback control 71 will feed the video buffer memory 34 with a bypass command in order to transfer the played back video signal to the video output circuit 73 as is.

The video output circuit 73 is similar to the video output circuit 47 of the digital recorder 30 of FIG. 16, comprising of an OSD (on screen display) for displaying upon command onto the picture displayed on the monitor 60, the time and date of the recording and/or the identification code and/or name and/or text and/or the alarm particulars, all fed from the playback control 71 on the basis of data stored in system memory 72.

The system memory 72 can also be fed manually or automatically via the playback control with data pertaining the transmitters 2 or 4 and/or the data pertaining the alarm sensing particulars of each individual receiving means 10~10F and each digital recorder means 30 and each digital recorder rack 50 shown in FIG. 19. By such memorized data the playback control is able to instantly address the selector S70 to select the correct input line 78/1~78/n pertaining a selected identification code or codes of a given transmitting means 2 or 4. When only single digital recorder 30 is used, or when only single digital recorder rack 50 is used the selector switch S70 is not used and is not necessary.

The playback control 71 is further provided with data in-out terminal or terminals 77/1~77/n for transmitting record or playback select commands to the cascade control 52 of the digital recorder racks and for receiving data pertaining the recording and/or playback and/or alarms particulars.

By the use of the playback receiver it becomes clear that with a simple cascaded connections of a plurality of digital video recorders 30 mounted onto a plurality of video recorders racks it is possible, according to my invention, to record the signals of large number of cameras onto large number of digital recorders for an extended time, by a simple multiple FIFO rotations, and storing alarm related camera signals onto a separate memory storage devices for a long or for permanent storing, and retrieving instantly any of the recorded signals by a simple select command of a time and date, camera identification and/or alarm particulars. It is further obvious that by providing the data pertaining the camera identification, the time and date of the recording and the alarm particulars inside the vertical blanking portion of the video signals it is possible to propagate a clean unobstructed playback signals and superimpose the data onto the picture by an operator command only when it is needed.

It should be understood, of course, that the foregoing disclosure relates to only a preferred embodiment of the invention and that it is intended to cover all changes and modifications of the example of the invention herein chosen for the purpose of the disclosure, which modifications do not constitute departures from the spirit and scope of the invention.

What is claimed is:

1. A method for processing and recording video signals generated by a plurality of video transmitters and propagated via video transmission lines to a recording receiver for outputting processed video signals and for feeding each of said processed video signals mixed with individually allotted code signals in timed sequence to a digital recorder;

said code signals are generated and mixed into said video signals through at least one code generator and mixer circuit selected from a group consisting of individual code generator and mixer included in each of said transmitters, individual code generator and mixer extended along each of said transmission lines, multiple code generator and mixer included in said recording receiver and a combination thereof;

said recording receiver including at least one timing circuit selected from a group consisting of a synchronous switch, time base corrector, external synchronizing generator, parallel video signals compressing circuit, parallel to serial converter and a combination thereof for processing and organizing the timing of said video signals and for outputting said processed video signals selected from a group consisting of externally synchronized, time base corrected, compressed, parallel to serially converted and a combination thereof in said timed sequence to said digital recorder having at least one main memory storage device for routine recording of said video signals in endless sequence rotation, and at least one secured memory selected from exclusive memory device and a portion of said main memory for retaining said video signals recorded during an alarm state and an alarm data signal input for triggering said alarm state, the method comprising the steps of:

extracting said identification code from each sequencing individual video signal, for routinely storing individual processed video signals one after another in sequence along with the extracted identification code thereof, on the basis of the time and date of said routine recording, into said at least one main memory storage devices, one after another, each to its capacity, in endless cascaded rotation, wherein freshly recorded signals replace the oldest stored signals;

at least one of duplicating and transferring said signals recorded during said alarm state to said at least one secured memory. Thereby retaining and protecting said signals recorded during said alarm state from routine replacement by said freshly recorded signals;

retrieving said stored signals from said at least one main memory storage device and said at least one secured memory on the basis of said time and date of the routine recording of at least one of said stored signals and said stored identification code, and said alarm data signal; and decompressing the retrieved signals and re-injecting said identification code signals, with or without the time and date signals of the time and date of the recording of said retrieved signals, and with or without said alarm data signal into the vertical blanking portion of the decompressed video signals for outputting said decompressed video signals to a monitor and a playback receiver.

2. The method as set forth in claim 1, wherein said transmitters are externally synchronized and the synchronizing of said plurality of transmitters further comprises the steps of:
- transmitting from said external synchronizing generator a pulse signal having a voltage level higher than a maximum voltage level of said video signals or lower than a minimum voltage level of said video signals to respective transmitting means over said video transmission lines as an external synchronizing signal by using blanking level portions of the video signals;
- separating said pulse signal transmitted over said transmission line from said video signals by comparing said video signals to a reference signal having a predetermined voltage level; and applying said separated pulse signal to respective transmitting means.

3. The method as set forth in claim 2, wherein said pulse signal is opposite in polarity to an internal synchronizing signal which is contained in each of said video signals.

4. The method as set forth in claim 1, which for synchronizing said plurality of transmitters further comprises the steps of
- transmitting an external synchronizing signal from said external synchronizing generator selected from one of a horizontal and vertical drive signal, or vertical drive signal, or composite signal or horizontal and vertical drive signal, a vertical drive signal, a composite signal, a horizontal signal and a vertical signal over said transmission lines; and
- receiving said signal transmitted over said transmission line and applying said signal to respective video transmitters.

5. The method as set forth in claim 1, which for mixing said identification code signal with said video signal further comprises generating said individually allotted identification code for each individual signal of said video signals for injecting said individually allotted code into one of said transmitters, or anywhere along said video transmission line, or at an input of said synchronous switch.

6. The method as set forth in claim 5, which for mixing said identification code signal with said video signal, further comprises generating plurality of said individually allotted identification codes for the plurality of said transmitters and injecting said individually allotted identification codes into said processed video signals on the basis of each sequencing step by one of said synchronous switch and said parallel to serial converter.

7. The method as set forth in claim 1, wherein said alarm data signal is combined with said recorded signals during said alarm state.

8. The method as set forth in claim 1, wherein said step of at least one of duplicating and transferring said signals recorded during said alarm state to said at least one secured memory further comprises extending said step of at least one of duplicating and transferring recorded signals to include signals recorded prior to said triggering of said alarm state and after said alarm state has been cleared.

9. The method as set forth in claim 1, further comprises of the steps of:
- at least one of duplicating and transferring any of said stored signals by selecting one of the time and date of recording of said stored signals, said identification code, and said alarm data signal to said at least one secured memory, thereby retaining and
- protecting any of said stored signals from routine replacement by said freshly recorded signals.

10. The method as set forth in claim 1, and further comprising the extracting at least one of the injected identification code, said time and date and said alarm data signal from said decompressed video signals for superimposing, upon command, said at least one of said code, said time and date and said alarm data signal onto a picture displayed on said monitor.

11. The method as set forth in claim 1, wherein said digital recorder further includes a directory memory for storing texts or names on the basis of said identification codes and the method further comprises retrieving a text or name from said directory memory on the basis of said code for superimposing upon command said text or name onto said picture displayed on said monitor.

12. The method as set forth in claim 1, and further comprising combining a plurality of said decompressed video signals retrieved on the basis of at least one of said time and date and a plurality of identification codes for displaying on command onto said monitor, one of a split picture and multi-screen picture selected from the group consisting of a picture in picture, quad picture, 9 split picture, 16 split picture and a combination thereof.

13. The method as set tot in claim 1, and further comprising cascading a plurality of said digital recorders for enlarging the total recording capacity, wherein each of said cascaded digital recorders records to a capacity thereof one after another in endless rotation, and wherein freshly processed signals replace the oldest stored signals.

14. The method as set forth in claim 13, which further comprises the steps of:
- retrieving any stored signals from any of said cascaded digital recorders on the basis of said at least one of time and dare of the recording of at least one of the retrieved signals, said stored identification code and said alarm data signal;
- decompressing said retrieved signals and re-injecting said identification code signals, with or without the time and date signals of the time and date of the recording of said retrieved signals, and with or without said alarm data into the vertical blanking portion of the decompressed video signals for outputting said decompressed video signals to one of a monitor and a playback receiver.

15. The method as set forth in claim 1, adapted for playing back said routinely stored signals and said signals recorded during said alarm state through said playback receiver further comprising the steps of:
- extracting from said decompressed video signals at least one of said re-injected time and date of the recording, said re-injected identification code or codes and said re-injected alarm data; and
- selecting video signals for playback on the basis of said a least one of said extracted code, said time and date of the recording and said alarm data, and outputting a selected video signals to a monitor.

16. The method as set forth in claim 15, and further comprising applying at least one of the extracted identification code said time and date of the recording and said alarm data signal for superimposing upon command, one of said code, said time and date and said alarm data onto a picture displayed on said monitor.

17. The method as set forth in claim 15, wherein said playback receiver further includes a directory memory for storing texts or names on the basis of said identification codes and the method further comprises retrieving a text or name from said directory memory on the basis of said code and superimposing upon command said text or name onto said picture displayed on said monitor.

18. The method as set forth in claim 15, and further comprising combining a plurality of said retrieved video signals on the basis of said time and date and a plurality of said identification codes for displaying on command, onto said monitor one of a split picture and multi-screen picture selected from the group consisting of a picture in picture, quad picture, 9 split picture, 16 split picture and a combination thereof.

19. The method as set forth in claim 14, adapted for playing back at least one of said routinely stored signals and said signals recorded during said alarm state through said playback receiver further comprising the steps of:
   extracting from said decompressed video signal said at least one of re-injected time and date of the recording, said re-injected identification code and said re-injected alarm data signal; and
   selecting video signals for playback on the basis of said at least one of said extracted code, said time and date of the recording and said alarm data, and outputting selected video signals to a monitor.

20. The method as set forth in claim 19, further comprising applying said at least one of the extracted identification code, said time and date of the recording and said alarm data, for superimposing upon command, said at least one of said code, said time and date and said alarm data onto a picture displayed on said monitor.

21. The method as set forth in claim 20, wherein said playback receiver further includes a directory memory for storing texts or names on the basis of said identification codes and the method further comprises retrieving a text or name from said directory memory on the basis of said code and superimposing upon command said, text or name onto said picture.

22. The method as set forth in claim 14, further comprising combining a plurality of said retrieved video signals on the basis of said time and date and on the basis of a plurality of said identification codes for displaying on command onto said monitor one of a split picture and multi-screen picture selected from the group consisting of a picture in picture, a quad picture, a 9 split picture, a 16 split picture and a combination thereof.

23. An apparatus for processing and digitally recording a plurality of video signals comprising:
   a plurality of transmitters for generating video signals;
   a recording receiver for receiving said video signals, said recording receiver includes at least one timing circuit selected from a group consisting of a synchronous switch, time base corrector, external synchronizing generator, multi video signal compressing circuit, parallel to serial converter and a combination thereof for organizing the timing of said video signals and for connecting said plurality of transmitters to a digital video recorder in timed sequence;
   a plurality of video transmission lines for connecting said plurality of transmitters to said recording receiver;
   at least one coding circuit for generating and mixing code signals corresponding to an identification code allotted to each said video signal selected from a combination coding circuits comprising coding circuit included in said transmitters, coding circuit extended along said transmission lines, coding circuit adjacent to said timing circuit and a combination thereof for mixing selectively said code signals with said video signal;
   said digital video recorder including a central processing circuit, time and date signal generator, decoding/encoding circuit for receiving said video signals in timed sequence for extracting said identification codes from the received video signals, and a compression/decompression circuit for compressing said received video signal and for outputting a compressed signal along with the extracted identification codes thereof and the time and date of the recording to one of main memory selected from, single memory device and plurality memory devices;
   said main memory routinely stores said compressed signals along with said identification code and said time and date of the recording to its capacity, wherein freshly stored signals replace the oldest stored signals and wherein said capacity of said plurality memory devices combines said plurality memory devices in an endless cascaded rotation, one after another;
   an alarm data signal input for receiving an alarm signal and for triggering an alarm state; and
   at least one secure memory selected from exclusive memory device ant a portion of said main memory for retaining said video signals stored during said alarms state, wherein said compressed signals routinely stored during said alarm state along with said identification codes and said time and date of the recording is subjected to as least one of duplication and transfer to said at least one secure memory, thereby retaining and protecting said recording during the alarm state from routine replacement by said freshly stored signals,
   wherein said central processing circuit retrieves said stored signals from said at least one main memory and said at least one secure memory on the basis of at least one of said time and date of the recording of said stored signal, said stored identification codes and said alarm date and wherein said compress/decompress circuit decompresses the stored signals and said decoding/encoding circuit mixes said identification code signals, with or without the time and date signals of the recording of the retrieved signals, and with or without said alarm data, into the decompressed video signals for outputting said decompressed video signals to one of a monitor or to a playback receiver.

24. An apparatus for processing and recording plurality of video signals as set forth in claim 23, wherein said external synchronizing generator feeds said video transmission lines and said timing circuit a pulse signal having a voltage level higher than a maximum voltage level of said video signals generated by the respective transmitters or lower than a minimum voltage level of said video signal;
   wherein each of said transmitters includes an externally synchronized television camera and a comparator circuit associated respectively with said television camera for separating said pulse signal transmitted over said video transmission lines from said video signals by comparing said video signals to a reference signal having a predetermined voltage level, and applying said separated pulse signal to each of said television camera for synchronizing the television cameras to each other and to said switch.

25. The apparatus for processing and digitally recording plurality of video signals as set forth in claim 24, wherein said pulse signal is opposite in polarity to an internal synchronizing signal which is contained in each of said video signals.

26. The apparatus for processing and digitally recording plurality of video signals as set forth in claim 23, wherein said example synchronizing generator feeds external synchronizing signal selected from the group consisting of a horizontal and vertical drive signal, a vertical drive signal, a composite signal, and horizontal and vertical signal over said transmission lines and to said timing circuit.

27. The apparatus for processing and digitally recording plurality of video signals as set forth in claim 23, wherein said circuit for generating code signals generates a plurality of said codes allotted to each individual video signal for mixing a selected individual code with said video signals into an output pole of said timing circuit, wherein the mixed code is commensurate with the identification code allotted to a video signal connected to said output pole.

28. The apparatus for processing and digitally recording plurality of video signals as set forth in claim 23, wherein said alarm data signal is fed to said decoding/encoding circuit for mixing said alarm data signal with said stored signals during said alarm state.

29. The apparatus for processing and digitally recording plurality of video signals as set forth in claim 23, wherein said stored signals subjected to at least one of duplication and transfer, stored during said alarm state, to said at least one secure memory are extended to include stored signals, recorded at least one of prior to said triggering of said alarm state and after said alarm state has been cleared.

30. The apparatus for processing and digitally recording plurality of video signals as set forth in claim 23, wherein said stored signals subjected to at least one of duplication and transfer include any of said stored signals by selecting at least one of the time and date of the recording of said stored signals, said identification codes and said alarm data to said at least one secure memory.

31. The apparatus as set forth in claim 23, adapted for playing back said routinely stored signals and said signals stored during said alarm state, wherein said encoding/decoding circuit extracts at least one of the mixed identification codes, said time and date of the recording and said alarm data from said decompressed video signals and outputs a signal to a superimposing circuit for superimposing at least one of said code, said time and date and said alarm data onto a picture displayed on said monitor.

32. The apparatus as set forth in claim 31, adapted for playing back said routinely stored signals and said signals stored during said alarm state, wherein said encoding/decoding circuit further comprises a directory memory for storing texts or names on the basis of said identification codes for retrieving a text or name from said directory memory on the basis of said code for superimposing upon command said text or name onto said picture.

33. The apparatus as set forth in claim 23, adapted for playing back said routinely stored signals and said signals stored during said alarm state, wherein said central processing circuit further includes a picture memory circuit for combining a plurality of said decompressed video signals and outputting a combined video signal for displaying onto said monitor one of a split picture and a multi-screen picture selected from the group consisting of a picture in picture, a quad picture, a 9 split picture, a 16 split picture and a combination thereof.

34. The apparatus for processing and digitally recording plurality of video signals as set forth in claim 23, wherein a plurality of said digital recorders are connected in cascade for enlarging the total recording capacity; and wherein each of said digital recorders connected in the cascade records to its capacity one after another in endless rotation, and wherein freshly stored signals replace the oldest stored signals.

35. The apparatus as set forth in claim 34, adapted for playing back said routinely stored signals and said signals stored during said alarm state, wherein said central processing circuit retrieves said stored signals from at least one of said main memory and said at least one secure memory on the basis of at least one of said time and date of the recording of said stored signal, said stored identification codes and said alarm data, and wherein said compressing/decompressing circuit decompresses the recorded signals and said decoding/encoding circuit mixes said identification code signals, with or without the time and date signals of the recording of said retrieved signals, and with or without said alarm data, into the decompressed video signals for outputting said decompressed video signals to one of a monitor and a playback receiver.

* * * * *